July 2, 1968  J. B. RIDDLE ET AL  3,391,388
DETECTION APPARATUS
Original Filed Aug. 23, 1961  12 Sheets-Sheet 1
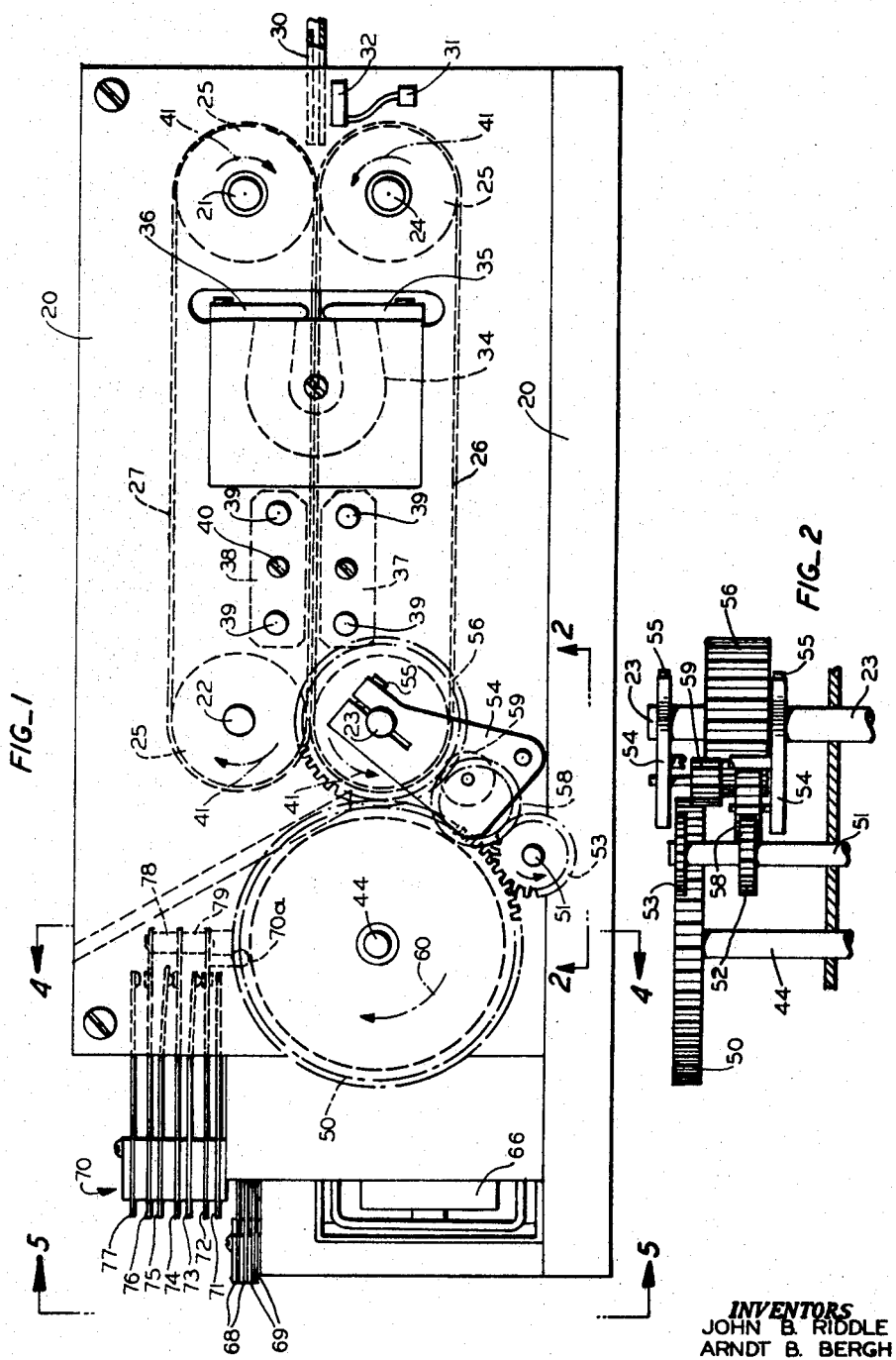
INVENTORS
JOHN B. RIDDLE
ARNDT B. BERGH
CHARLES O. FORGE
BY *Naylor & Neal*
ATTORNEYS July 2, 1968   J. B. RIDDLE ET AL   3,391,388
DETECTION APPARATUS
Original Filed Aug. 23, 1961   12 Sheets-Sheet 2
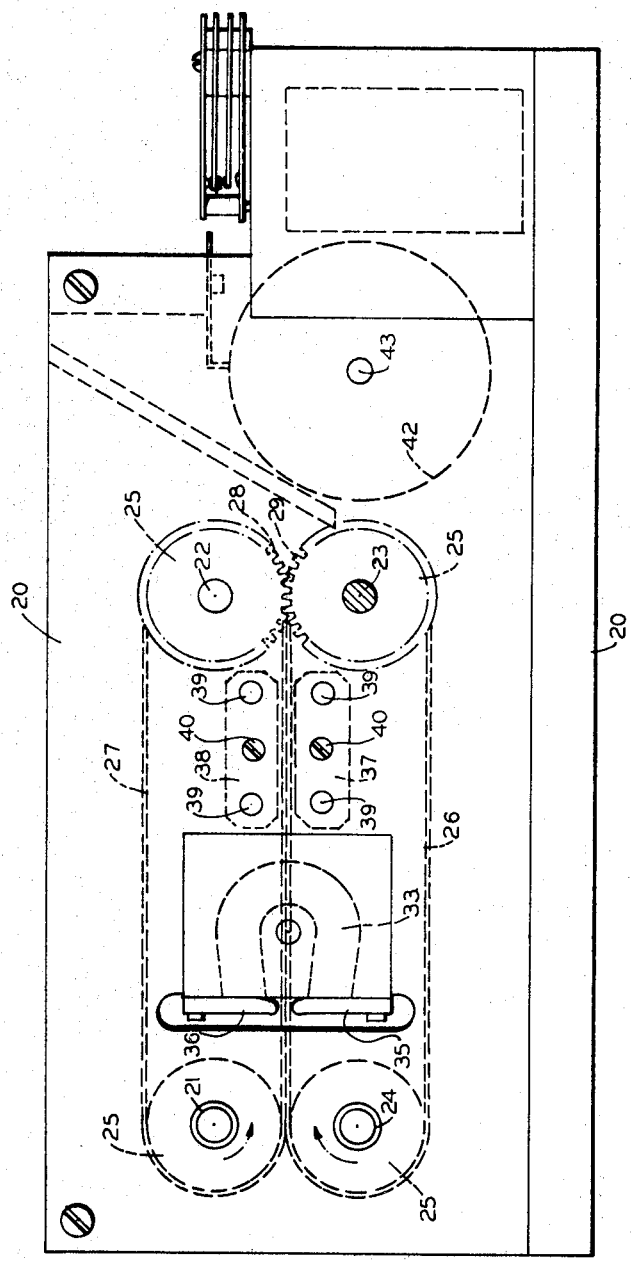
FIG_3
INVENTORS
JOHN B. RIDDLE
ARNDT B. BERGH
CHARLES O. FORGE
BY *Naylor & Neal*
ATTORNEYS

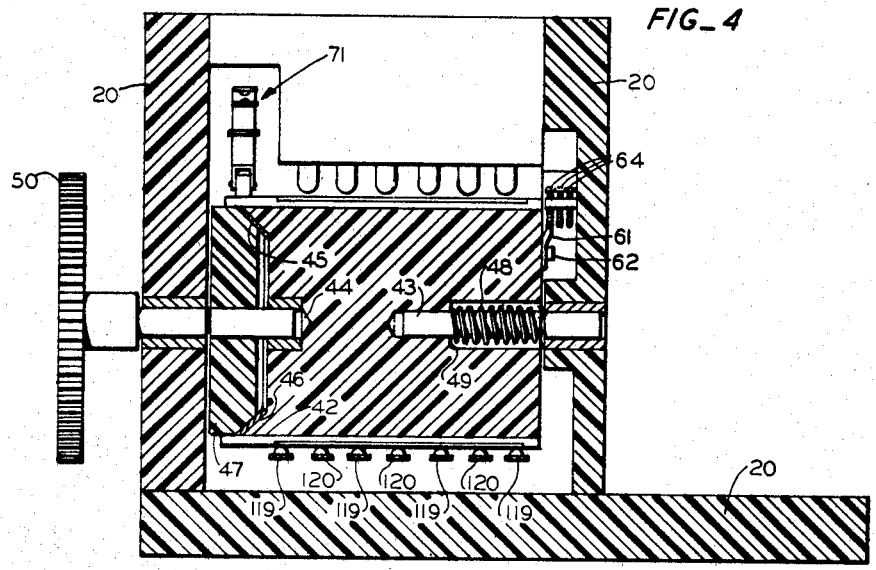
FIG_4
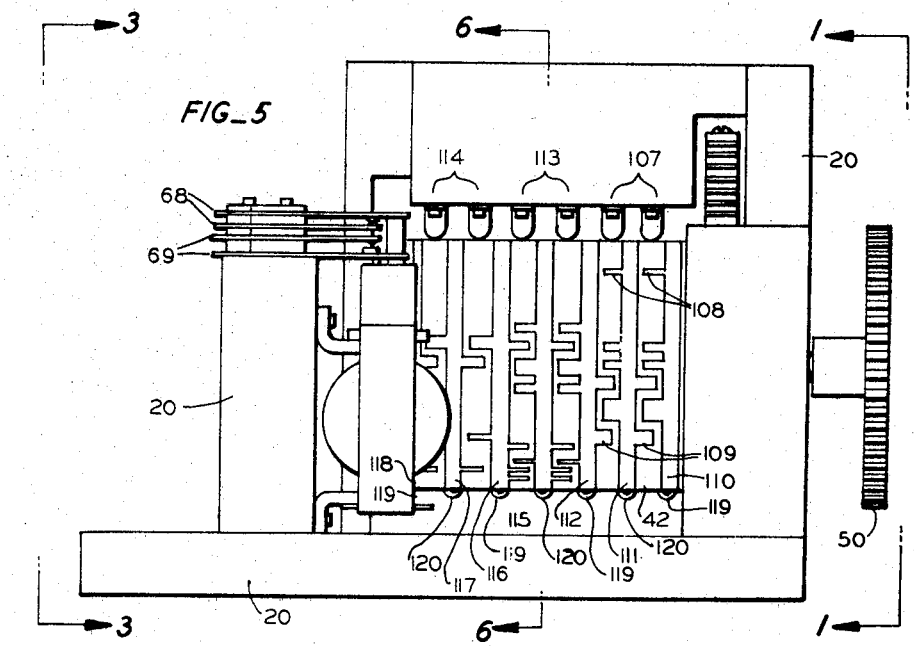
FIG_5

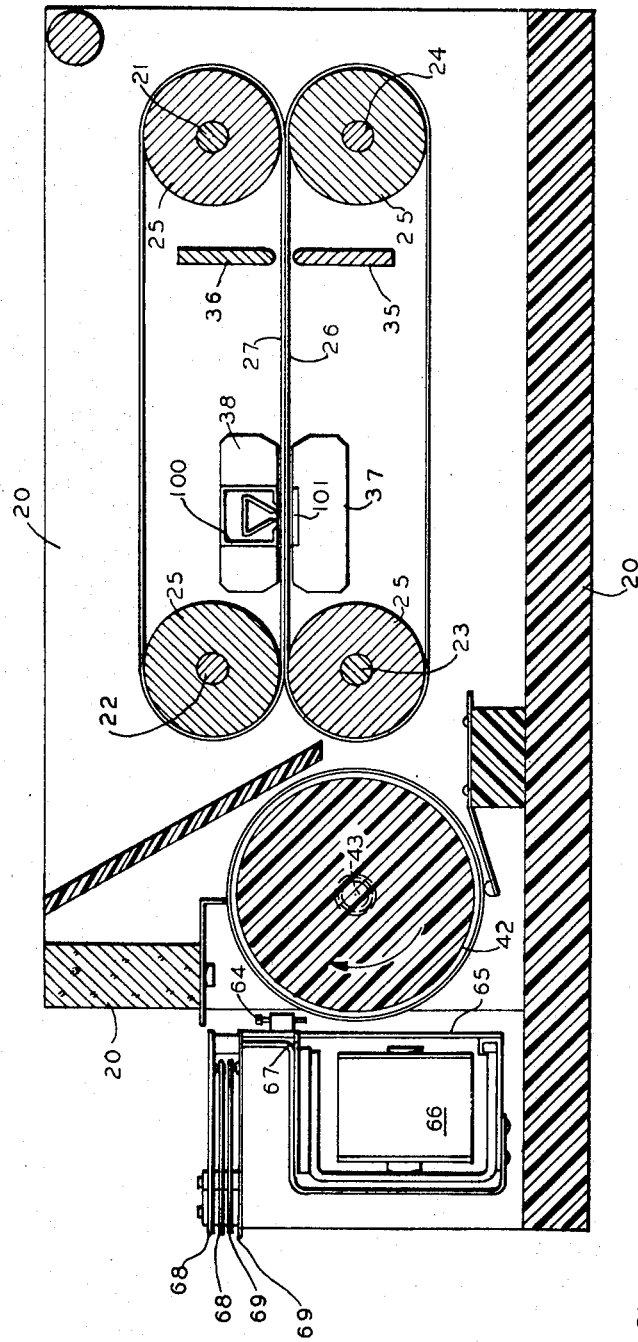

July 2, 1968 J. B. RIDDLE ET AL 3,391,388
DETECTION APPARATUS
Original Filed Aug. 23, 1961 12 Sheets-Sheet 5
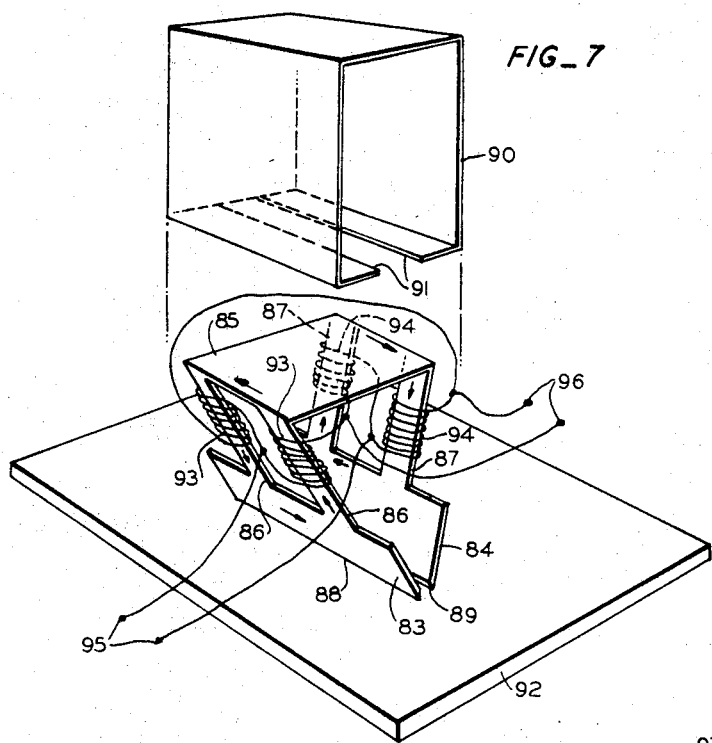
FIG_7
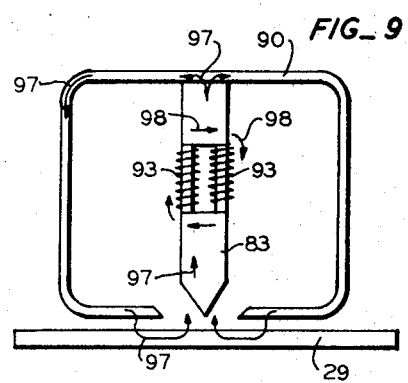
FIG_9
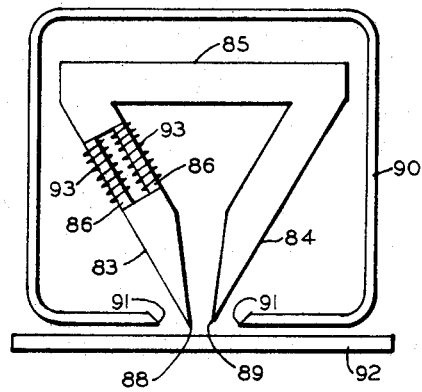
FIG_8
*INVENTORS*
JOHN B. RIDDLE
ARNDT B. BERGH
CHARLES O. FORGE
BY *Naylor & Neal*
ATTORNEYS

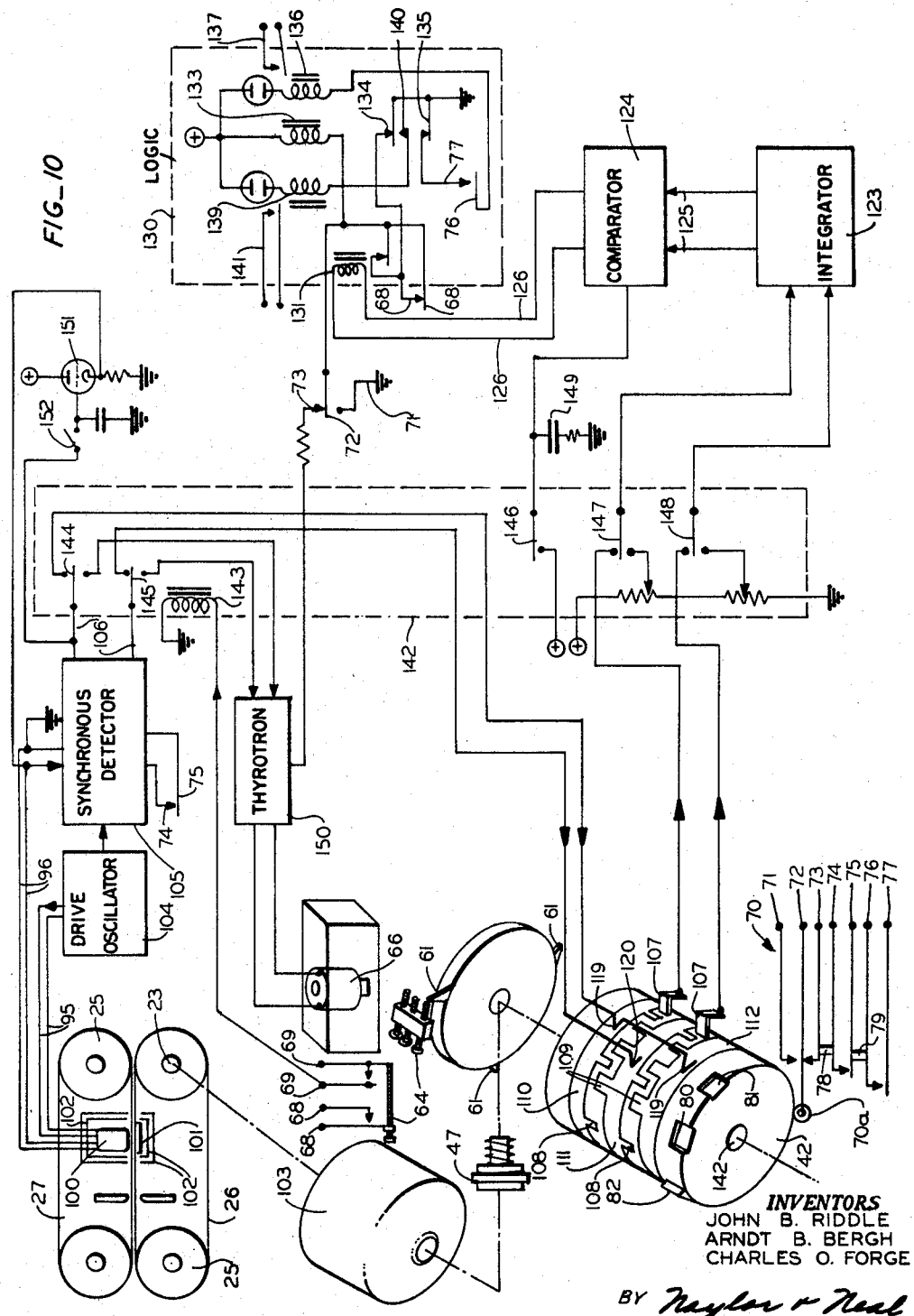

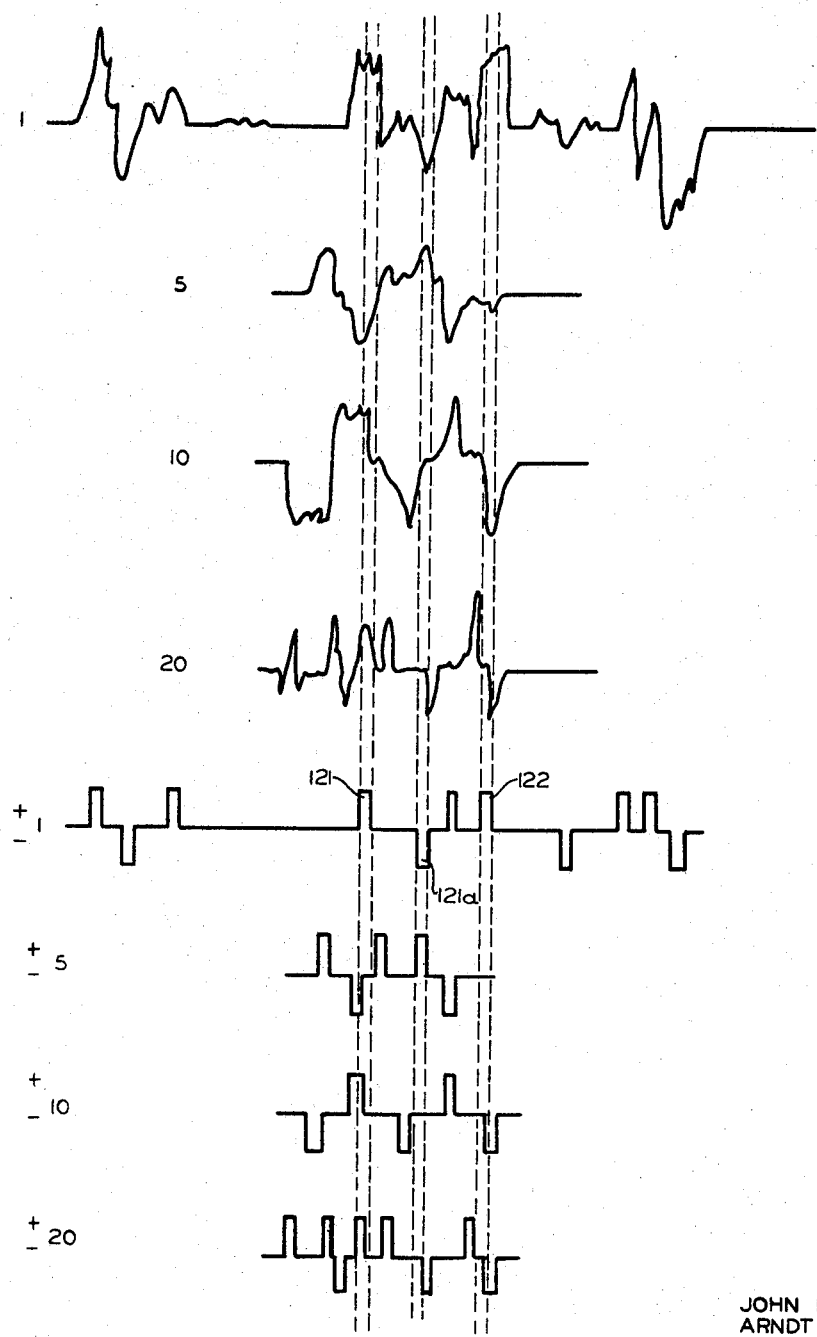

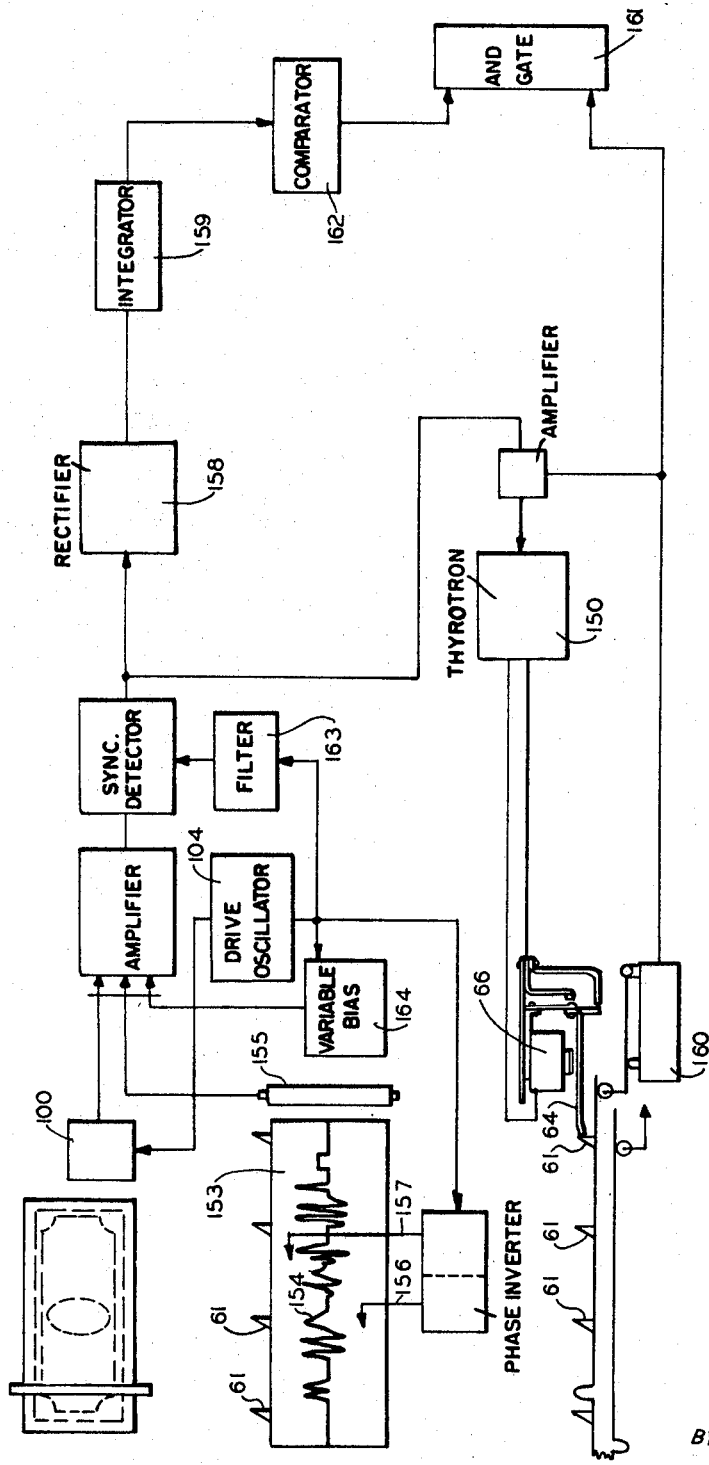

July 2, 1968   J. B. RIDDLE ET AL   3,391,388
DETECTION APPARATUS
Original Filed Aug. 23, 1961   12 Sheets-Sheet 9
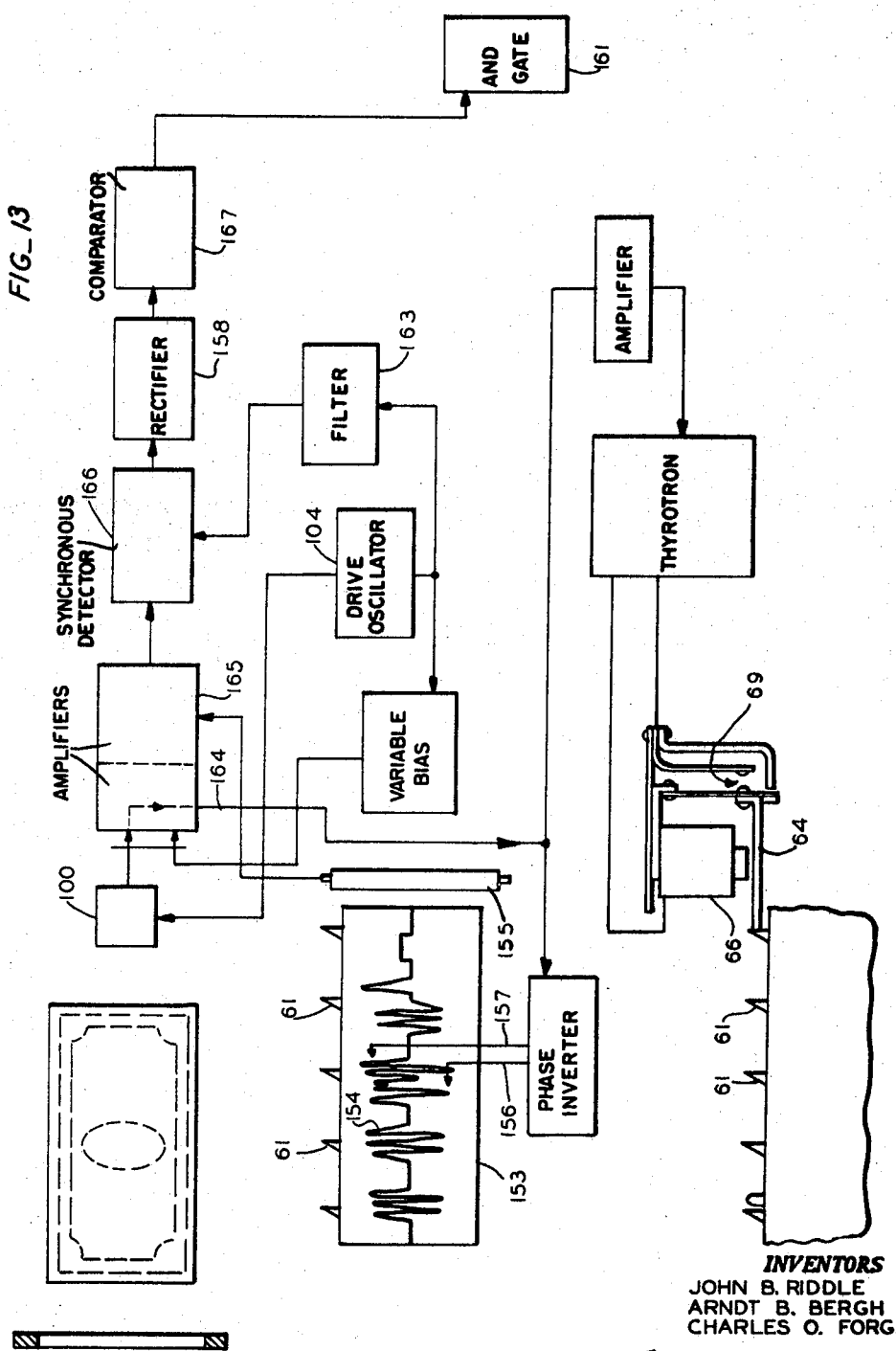
INVENTORS
JOHN B. RIDDLE
ARNDT B. BERGH
CHARLES O. FORGE
BY Naylor & Neal
ATTORNEYS July 2, 1968   J. B. RIDDLE ET AL   3,391,388
DETECTION APPARATUS
Original Filed Aug. 23, 1961   12 Sheets-Sheet 10
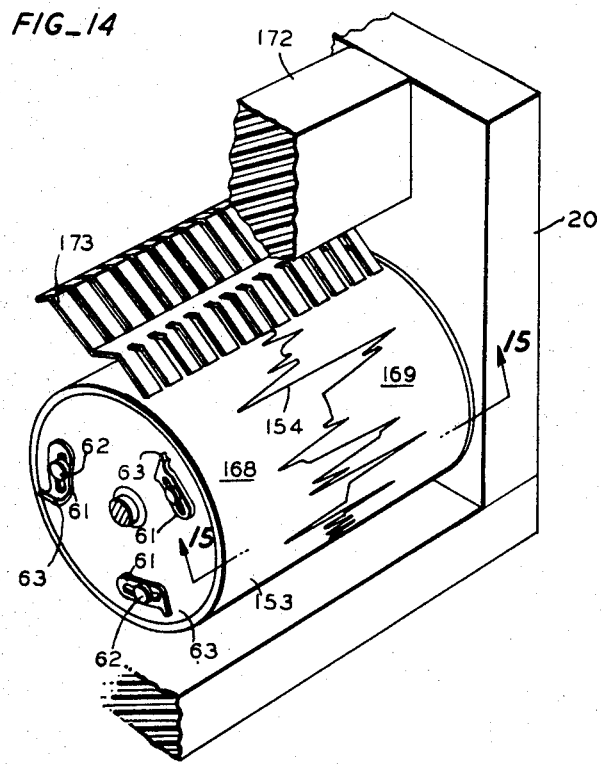
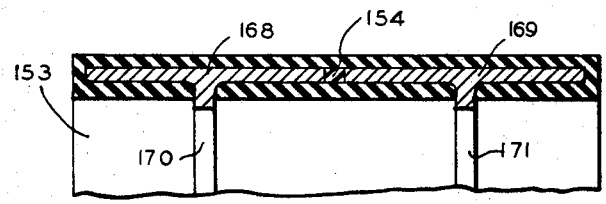
INVENTORS
JOHN B. RIDDLE
ARNDT B. BERGH
CHARLES O. FORGE
BY Naylor + Neal
ATTORNEYS

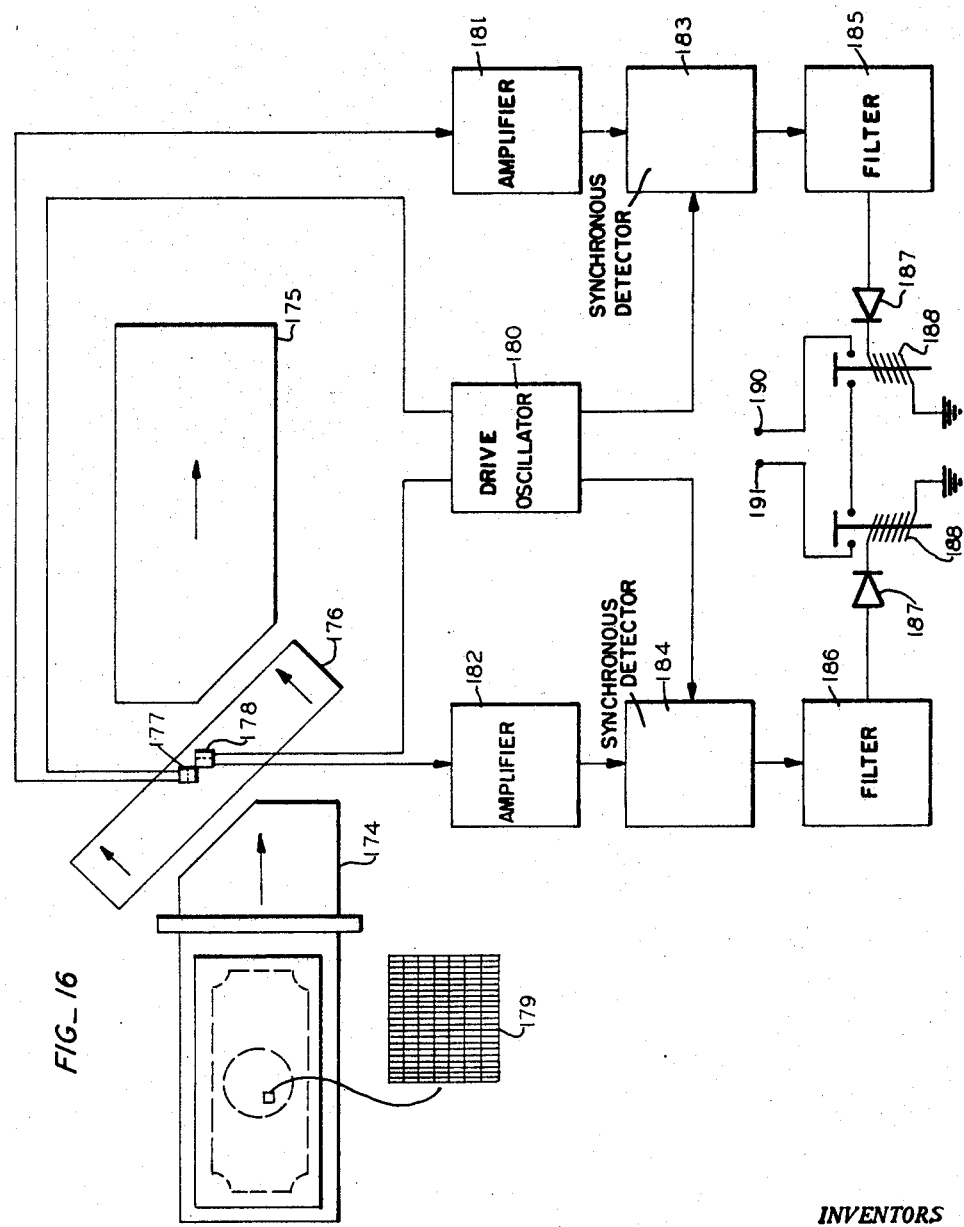
FIG_16

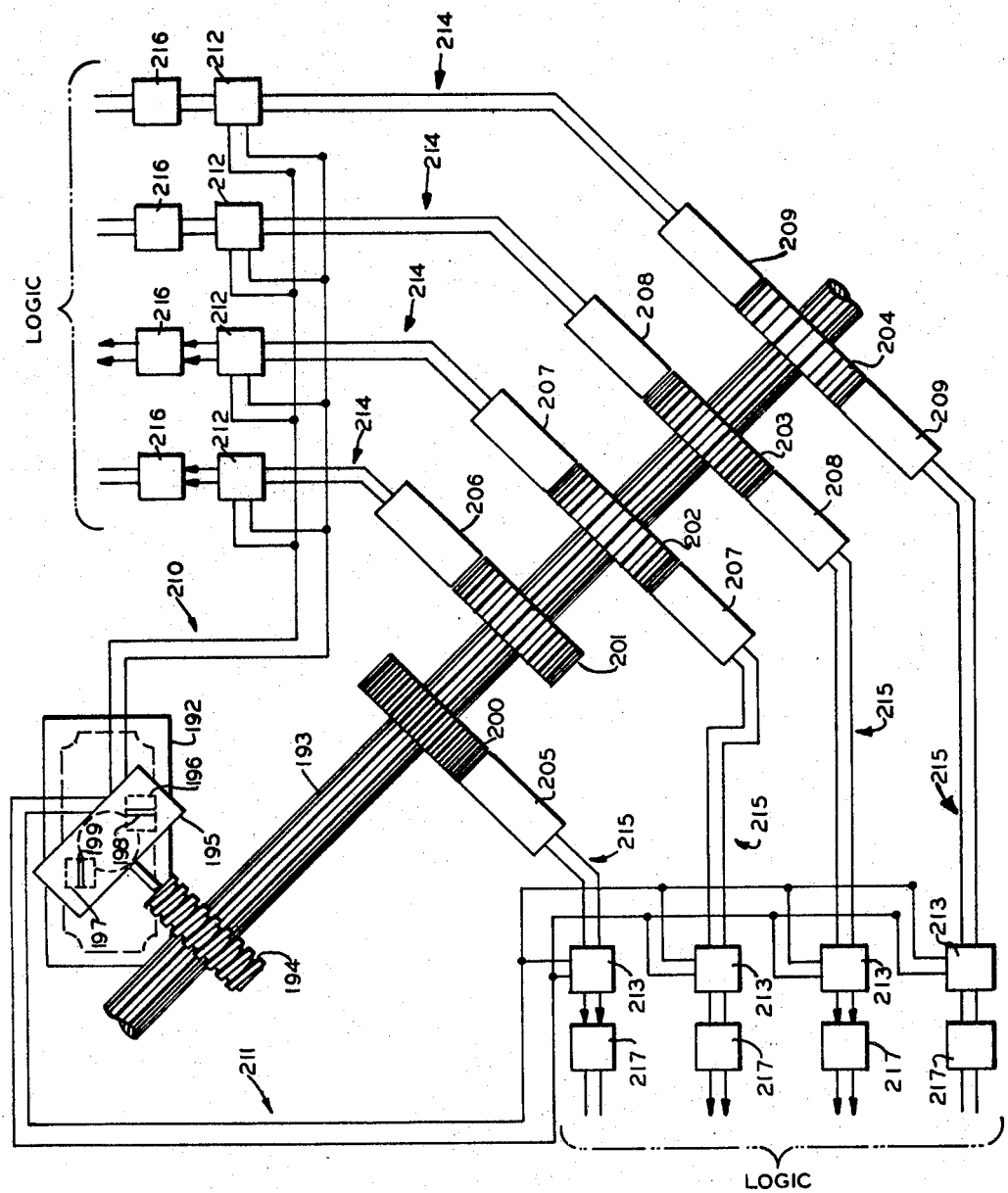
FIG_17
INVENTORS
JOHN B. RIDDLE
ARNDT B. BERGH
CHARLES O. FORGE
BY *Naylor & Neal*
ATTORNEYS

United States Patent Office 3,391,388
Patented July 2, 1968

3,391,388
DETECTION APPARATUS
John B. Riddle, 180 Waller Hays Drive, and Arndt B. Bergh, 3697 Evergreen Drive, both of Palo Alto, Calif. 94303, and Charles O. Forge, 20691 Homestead Road, Cupertino, Calif. 95014
Original application Aug. 23, 1961, Ser. No. 149,799, now Patent No. 3,280,974, dated Oct. 25, 1966. Divided and this application July 25, 1966, Ser. No. 596,024
8 Claims. (Cl. 340—149)

ABSTRACT OF THE DISCLOSURE

A method for recognizing individual ones of a plurality of predetermined signals by subdividing the signals into different portions where the signals differ from each other as indicated in FIG. 11, reversing the polarity of an unknown signal during one group of the subdivisions of the unknown signal, and integrating the unknown signal.

---

This application is a division of our earlier filed application Ser. No. 149,799, filed Aug. 23, 1961, now Patent No. 3,280,974 issued Oct. 25, 1966.

This invention relates to apparatus for recognizing printed matter in which the printed matter has a predetermined pattern indicia on a face thereof.

It is a principal object of the invention to provide apparatus for identifying printed matter by sensing the pattern of printed indicia on pieces of such printed matter.

It is another object of the invention to provide such apparatus for identifying printed matter which is sensitive to the existence or non-existence of very small fragments of the pattern of indicia on printed matter.

It is another object of the invention to provide such apparatus for identifying printed matter which is sensitive to the existence of these small fragments of indicia and which recognizes pieces of printed matter responsive to recognition of a sequence of these fragments.

It is another object of the invention to provide such apparatus for identifying printed matter which employs a detection element movable with respect to pieces of printed matter and adapted to generate an electrical signal responsive to the existence or non-existence of such very small fragments of the pattern of indicia on the printed matter.

It is another object of the invention to provide such apparatus in which the electrical signal is generated by the detection element only when the small fragment of the pattern of indicia adjacent to the detection element is nonuniform, so that no signal will be generated by the detection element when it is moved with respect to a completely uniform piece of printed matter or a blank piece on which no printing appears.

It is another object of the invention to provide apparatus for identifying printed matter in which a detection element scans the pattern of indicia on a piece of printed matter and in which the detection element sees only the smallest possible fragment of the pattern of indicia at each instant while it is scanning the pattern whereby the detection element sees the pattern in maximum detail.

It is another object of the invention to provide apparatus for identifying the individual members of a group of pieces of printed matter in which every piece of printed matter in the group has a predetermined series of predetermined patterns of indicia printed thereon but where the distances between adjacent patterns on different pieces of the group are different.

It is another object of the invention to provide such apparatus for identifying the members of the group of pieces of printed matter in which a detection element scans a piece of printed matter along a path which extends across the series of printed patterns thereon.

It is another object to provide apparatus for identifying the validity of pieces of printed currency of a given denomination by scanning the currency with a detector, such as a magnetic flux detecting head for detecting magnetized ink on the currency, an optical fiber for detecting illuminated areas of the printed pattern on the currency, a heat sensitive element for detecting heated ink on the currency, etc., and where a counterpart of a valid piece of currency of that denomination is provided with a pickup element movable with respect to the counterpart in synchronization with scanning of the currency by the detector, the detector being connected to the counterpart to initiate and restart movement of the pickup element with respect to the counterpart a plurality of times while the detector scans a given piece of the currency whereby the apparatus may recognize substantially all pieces of currency of the given denomination and reject all other printed matter even though the pieces of currency of the given denomination have a plurality of local areas of printed indicia thereon with each piece of currency of that denomination having all of the patterns but with the patterns spaced from each other by different distances on different pieces.

It is another object of the invention to provide apparatus for identifying pieces of printed matter in which a detection element is moved with respect to the pattern of indicia on a piece of printed matter and generates an electrical detection signal which is a parameter of the pattern but where the detection signal bears the same parametric relation to the pattern of indicia regardless of the relative speed with which the detection element and pattern are moved with respect to each other.

It is another object of the invention to provide such apparatus for identifying pieces of printed matter which will be substantially completely automatic in operation so that it may be left unattended and may be operated simply by the delivery thereto of a piece of printed matter to be identified.

It is another object of the invention to provide such automatic apparatus which may be left unattended and which will contain components of minimum monetary value to the average person, whereby tampering with the apparatus may be avoided.

It is another object of the invention to provide apparatus for identifying pieces of printed matter in which pieces of printed matter to be identified are inserted into the apparatus and in which an identifiable piece of printed matter will be identified regardless of the manner in which the piece is inserted into the apparatus.

It is another object of the invention to provide apparatus for recognizing the similarity between a piece of printed matter being examined and a predetermined standard reference.

It is another object of the invention to provide such recognition apparatus in which any desired predetermined degree of similarity may be required between the standard reference and the piece of printed matter being examined before recognition will be made.

It is another object of the invention to provide such apparatus for identifying printed matter which is simple and economical to make and dependable and trouble free in use, yet which will be sufficiently complex as to prevent all attempts to intentionally make it identify undesirable pieces of printed matter.

It is another object of the invention to provide apparatus for identifying printed matter which is sensitive to the quality of the ink with which a pattern of indicia is printed on such printed matter.

It is another object of the invention to provide apparatus of this type which is particularly well suited for identifying printed currency.

It is another object of the invention to provide apparatus of the greatest reliability for recognizing the validity and denomination of pieces of printed currency.

It is another object of the invention to provide such apparatus for recognizing the validity and denomination of pieces of printed currency which will be able to recognize all valid bills of a given denomination regardless of any differences between them caused by excessive use or the fact that they were printed at different times from different plates.

It is another object of the invention to provide such apparatus for recognizing all valid bills of a given denomination but which will refuse to recognize invalid bills and valid bills of other denominations.

It is another object of the invention to provide such apparatus for recognizing currency which will recognize all of the bills of a plurality of denominations rejecting all other pieces of printed matter and which will distinguish between the bills of the different denominations which it recognizes.

It is another object of the invention to provide such apparatus for recognizing currency which will refuse to recognize fractions of valid prices of currency.

It is another objects of the invention to provide such apparatus for recognizing printed currency by comparing an unknown bill to a predetermined physical counterpart.

While it is contemplated that the physical counterpart may be a piece of currency, it is an object of the invention to provide such apparatus in which the counterpart to which an unknown bill is compared is a synthetic element, not itself a counterfeit, derived from a valid bill of known denomination and which will have sufficiently little monetary value that people will not attempt to remove it from the apparatus.

It is another object of the invention to provide apparatus for recognizing printed currency which apparatus may be operated automatically and needs very little care so that it can be installed and used in unattended places as a part of a change making machine, automatic vending machine or the like.

It is another object of the invention to provide a currency recognition device in which a bill may be inserted along a path parallel to the length of the bill and in which the apparatus can recognize a valid bill regardless of which end of the bill is inserted first and regardless of which side of the bill is facing upwardly when the bill is inserted.

It is another object of the invention to provide apparatus for recognizing printed currency having a detection head for scanning pieces of such currency to be identified and means for moving the piece of currency and head with respect to each other and comparing the area of the printed pattern on the currency adjacent to the head to a predetermined standard reference as the head and piece of currency are moved with respect to each other.

It is another object of the invention to provide such apparatus for recognizing currency in which means are provided for resynchronizing comparison between the pattern on the bill and the reference standard a plurality of times while the head and bill are moving with respect to each other so that the apparatus can recognize as one type of bill a plurality of separate bills on which corresponding printed areas are differently placed.

It is another object of the invention to provide such apparatus for recognizing currency in which the detection head, at each instant during relative movement between bill and head, is sensitive to only a very small fragment of the pattern of indicia on the bill so that the head sees the printed pattern in sufficient detail to detect the fact that the bill was printed from poorly engraved plates.

It is another object of the invention to provide apparatus for recognizing the validity and denomination of printed currency by magnetizing the ink on said currency and then analyzing the pattern of magnetic flux adjacent to the printed indicia on the currency.

It is another object of the invention to provide such currency recognition apparatus in which means are provided for magnetizing the ink on bills in a direction perpendicular to the face of the bill and then moving the face of the bill past a magnetic flux measuring device, or magnetometer, to produce a detection signal from the magnetometer which is a parameter of the flux sensed by the magnetometer while the bill moves with respect thereto.

As used herein the term "magnetometer" means a device for statically sensing magnetic flux in space and generating an electrical signal which is a parameter of the flux sensed. The magnetometer contains a head portion for sensing static flux in a local area of space and a power means portion connected to the magnetometer for generating an electrical signal which is a parameter of the flux sensed by the head portion. The magnetometer is thus to be distinguished from what may be called a "dynamic head" which is a magnetic measuring device which generates an electrical signal as a parameter of the rate of movement of static magnetic flux adjacent to the device, the movement of flux resulting from the movement of the dynamic head in a static magnetic field, the movement of a magnetic field past a stationary dynamic head, etc. The use of the magnetometer instead of a "dynamic head" greatly reduces control and synchronization problems in the device, since with a magnetometer, an unknown bill may be examined and correlated to a known counterpart in space without reference to time whereas the use of a dynamic head may require accurate correlation with space and time.

It is another object of the invention to provide such apparatus in which, at each instant while the magnetized bill moves with respect to the magnetometer, the magnetometer measures magnetic flux from only a very small fragment of the pattern of indicia on the bill so that the magnetometer sees the pattern of indicia with maximum detail.

It is another object of the invention to provide an improved flux sensing head portion for the magnetometer used in apparatus of this type whereby the head portion will be able to see greater detail in a pattern of printed indicia than has been possible heretofore.

It is another object of the invention to provide apparatus for recognizing the validity and denomination of printed currency in which means are provided for magnetizing the ink on currency in a direction perpendicular to the face of the currency and then move the currency with respect to a magnetometer which will generate a detection signal which is a parameter of the pattern of indicia.

It is another object of the invention to provide such apparatus in which the magnetometer has extreme sensitivity both in its ability to detect minute quantities of magnetic flux and in its ability to detect such quantities of flux emanating from minute physical areas.

It is another object of the invention to provide such apparatus having means for adjusting the magnetometer output to a starting condition automatically prior to each time it is used for recognizing a piece of currency.

It is another object of the invention to provide such apparatus in which counterpart means are provided for synchronous comparison with the detection signal generated by the magnetometer so that an unknown bill may be recognized responsive to similarity between a predetermined reference and the detection signal derived from the unknown bill.

It is another object of this invention to provide such counterpart means containing a physical counterpart of a valid piece of currency in whi  the physical counterpart has the form of a shaped electrical conductor which may be prepared in a simple manner as a parameter of the signal which would be produced by the magnetometer when the valid piece of currency was examined thereby.

It is another object of the invention to provide particular systems for recognizing printed currency in this manner which do not employ sliding switch contacts whereby these particular systems may be employed in situations where sliding switch contacts deteriorate through corrosion etc.

It is another object of the invention to provide apparatus for scanning pieces of U.S. currency and generating an electrical signal with the amplitude and polarity of the signal varying as a function of the printed pattern scanned by the apparatus and with the apparatus having sufficient sensitivity that the signal generated thereby from any given U.S. bill will differ from the signal generated by the apparatus from any U.S. bill of different denomination.

It is another object of the invention to provide such apparatus with which the signals generated from all valid bills of each denomination will be similar to each other with the signals from bills of different denomination forming a group of predetermined signals which differ from each other.

It is another object of this invention to provide a method for distinguishing between the electrical signals of this group so that the U.S. bills represented thereby may be recognized and distinguished from each other.

It is another object of the invention to provide such a method by which any one of a group of different variable amplitude and polarity electrical signals may be recognized to the exclusion of the remainder of signals of the group.

Other objects and advantages of the invention and the inventive subcombinations thereof will become apparent from the following detailed description of several specific devices which may be employed in the practice of the principles of the invention, these specific devices being indicative however of but a few of the many ways in which the principles of the invention may be employed.

The above enumerated and additional objects of the invention are obtained by the separate and joint action of the following subcombinations illustrated in greater detail hereinafter: mechanical support and transport apparatus, improved magnetic flux measuring heads, synthetic counterparts for maintaining standard references to which an unknown piece of printed matter may be compared, and a plurality of composite systems employing the same together with a variety of means for controlling and regulating the systems.

These systems and subcombinations are illustrated in the accompanying drawings in which:

FIGS. 1 to 6 are drawings of physical support and transport means employed in the invention:

FIG. 1 being a side elevation of such transport means, FIG. 2 being a fragmentary view taken along the plane and in the direction indicated at 2—2 in FIG. 1 and illustrating specifically the drive reversing means shown in FIG. 1, FIG. 3 being a side elevational view of the apparatus taken from the opposite side as FIG. 1, FIG. 4, being a vertical section of the apparatus taken along the plane 4—4 of FIGS. 1 and 3, FIG. 5 being a view in end elevation of the apparatus, and FIG. 6 being a longitudinal section of the apparatus taken along the plane 6—6 of FIG. 5;

FIGS. 7 to 9 are drawings of three alternative forms of improved magnetic flux measuring heads forming a part of the invention and forming an important new subcombination having substantial utility and unique features apart from its use with other components of the invention:

FIG. 7 being a perspective view of a preferred form of head, FIG. 8 being an end elevation of an alternative form of improved head, and FIG. 9 being an end elevation of still another alternative form of improved head;

FIG. 10 is a composite drawing and circuit diagram of a preferred system of the invention showing the apparatus of FIGS. 1 to 9 interconnected with electronic means for rendering the apparatus operative automatically and efficiently;

FIG. 11 shows, first in the upper portion, parts of four wave forms which might be obtained by recording the detection signal produced by the magnetometer shown in FIG. 10 while valid bills of four different denominations were examined by the apparatus and showing, second in the lower portion, four different shapes which would be used for the switching conductors on the rotatable drum shown best in FIGS. 4, 5 and 10, when the four different denominations indicated in the upper part of the drawing were to be recognized. For simplicity of illustration and description, the curves and shapes are aligned in synchronization vertically of the drawing, and the shapes in the lower part of the drawing are illustrated schematically;

FIGS. 12 and 13 are composite schematic drawings and circuit diagrams of alternative systems of the invention in which a new variable capacitor is employed as a synthetic counterpart signal generator for generating a predetermined electrical signal against which the detection signal derived from an unknown bill is compared:

FIG. 12 showing a system arranged for adding together the detection signal and synthetic counterpart signal, and FIG. 13 showing a system for multiplying the signals together;

FIGS. 14 and 15 are drawings of the new variable capacitor employed in FIGS. 12 and 13 as a synthetic counterpart signal generator and which may be employed in many instances for generating any desired predetermined synthetic signal apart from the remainder of the elements of the system;

FIG. 14 showing a perspective view of the variable capacitor, and FIG. 15 showing a sectional view through the apparatus of FIG. 14 along the plane 15—15;

FIG. 16 is a schematic diagram of another alternative system of the invention in which two magnetic flux measuring heads are employed to examine the fine-lined background of the picture on a bill; and FIG. 17 is a schematic diagram of another alternative system of the invention similar to the system but employing dynamic flux detection instead of static detection.

*Mechanical support and transport apparatus*

Referring now in detail to the drawings and particularly to FIGS. 1–6, the apparatus illustrated therein for transporting pieces of printed currency to be examined comprises a frame 20 on which are mounted four axles 21, 22, 23, and 24, each of the axles carrying a roller 25 with belts 26 and 27 extending over horizontally disposed pairs of rollers 25 as indicated. The belts 26 and 27 are preferably made of thin sheets of suitable plastics which contain no magnetizable substances.

The axle 23 (as best seen in FIG. 3) extends laterally from the frame 20 and may be attached to a suitable motor to be driven thereby, the axles 22 and 23 carrying gears 28 and 29 thereon by which the two belts 26 and 27 are driven in synchronization. A loading tray 30 (see FIG. 1) is mounted adjacent to the bite of the rollers 25 on axles 21 and 24 to deliver to the belts 26 and 27 pieces of printed currency inserted in the tray 30. A start switch 31 actuated by a photoelectric cell 32 is mounted adjacent to the tray 30 and positioned to be closed when a piece of currency is inserted in the tray 30 interrupting light transmission to the cell 32; the switch 31 is connected to the motor (not shown) which drives the axle 23 to start operation of the motor. For reasons that will appear hereinafter the width of the tray 30, measured in a plane perpendicular to FIG. 1, is preferably substantially equal to the width of pieces of printed currency which are to be examined by the apparatus whereby pieces of printed currency are fed to the belts 26 and 27 along a path generally parallel to the lengths of the pieces of currency.

A pair of horseshoe magnets 33 and 34 are mounted adjacent to opposite edges of the belts 26 and 27 rigidly attached to the frame 20, and a pair of magnetic pole pieces 35 and 36 are rigidly attached to like ends of the magnets 33 and 34 whereby one pole piece becomes a north pole and the other pole piece becomes a south pole with a magnetic field extending between the pole pieces 35 and 36 generally perpendicular to the belts 26 and 27. It should be noted that the belts 26 and 27 convey pieces of printed matter between the pole pieces 35 and 36 so that magnetizable particles in the ink with which the currency is printed are magnetized in a direction perpendicular to the faces of the piece of currency, one face of the piece of currency becoming a north pole and the other face becoming a south pole.

A pair of brackets 37 and 38 are rigidly attached to the frame 20 by dowels 39 and screws 40 with the brackets 37 and 38 being positioned on opposite sides of the adjacent courses of the belts 26 and 27 so that pieces of printed matter conveyed by the belts will pass between the brackets 37 and 38 subsequent to their passage between the magnetic pole pieces 35 and 36. Accordingly it should be noted that normal operation of the motor which drives axle 23 causes rotation of the rollers 25 and the gears 28 and 29 in the direction indicated by the arrows 41. As explained in greater detail hereafter, a magnetic flux measuring head portion of a magnetometer is mounted on the brackets 37 and 38 to measure the pattern of magnetic flux surrounding printed indicia on currency supported by the belts 26 and 27. The brackets 37 and 38 are mounted centrally of the width of belts 26 and 27 so that the head portion of the magnetometer will see the same strip of a bill regardless of which face of the bill is placed upwardly in the tray 30.

It will thus be noted that this apparatus provides means for maintaining the pole pieces 35 and 36 and the flux sensing head in brackets 37 and 38 in stationary positions fixed with respect to each other while a piece of currency to be examined is moved with respect to them. While it may be possible to reverse this procedure and move the pole pieces and flux sensing head while holding the piece of currency stationary, it has been found that the manner of operation illustrated is much more desirable since the reverse procedure necessitates excessive shielding of the flux sensing head, since when the head is moved it is moved through the earth's magnetic field, and it has been found that the quantities of magnetic flux sensed by the head from pieces of currency are substantially less than the quantities of flux in the earth magnetic field through which the head would have to pass if it were moved.

As explained in connection with FIG. 10 hereafter, passage of a piece of currency along the path between the pole pieces 35 and 36 and the brackets 37 and 38 produces a detection signal which is a parameter of the pattern of printed indicia on the currency. This detection signal is compared continuously with a physical counterpart derived from a pattern of printed indicia on a valid piece of currency of known denomination, favorable comparison effecting recognition of the test bill, and unfavorable comparison effecting rejection of the test bill. When the test bill is to be rejected, the direction of movement of the motor driving axle 23 is reversed to thereby deliver the test bill back to the end of the apparatus adjacent to the tray 30.

Synchronization of comparison between the detection signal and the physical counterpart of a known bill is effected by mounting the physical counterpart on a rotatable drum 42 (see FIGS. 2–6), rotating the drum 42 by means of the mechanical linkage shown in FIG. 2, and electronic synchronization means to be described in greater detail hereinafter. The drum 42 is rotatably supported on the frame 20 by means of a pair of stub shafts 43 and 44. The drum 42 is provided with an internal, generally conical, friction lining 45 engageable with a clutch surface 46 on a disc 47, with the surfaces 45 and 46 being resiliently urged together by means of a compression spring 48 engaging an internal shoulder 49 in the drum 42. The drum 42 is freely rotatable on the shafts 43 and 44 and is caused to rotate solely by frictional contact between the surfaces 45 and 46. The disc 47 is rigidly attached to the shaft 44, and the shaft 44 carries a drive gear 50 rigidly attached thereto.

A shaft 51 is mounted on the frame 20 and carries an inner gear 52 (see FIG. 2) and an outer gear 53 with the gear 53 being engaged with the drive gear 50. A reversing shoe 54 is frictionally mounted on the shaft 23 by means of bolts 55 so that normal rotation of the shaft 23 urges counterclockwise rotation of the shoe 54, and reverse movement of the shaft 23 urges clockwise rotation of the shoe 54. The shaft 23 carries a gear 56 thereon, and the shoe 54 carries a forward drive gear 58 and a reverse drive gear 59 thereon with both of the gears 58 and 59 in permanent engagement with the gear 56. The gears 58 and 59 are arranged as indicated so that (1) the gear 58 engages with gear 52 when the shoe 54 rotates counterclockwise to thereby effect rotation of drive gear 50 in the direction of arrow 60, and (2) the gear 58 disengages from gear 52 and the gear 59 engages with gear 50 responsive to clockwise rotation of the shoe 54 to thereby rotate the drive gear 50 in the direction of arrow 60 regardless of the direction of rotation of the shaft 23. This constant directional rotation of the drive gear 50 and hence the drum 42 regardless of the direction of rotation of the shaft 23 permits the apparatus to recognize a recognizable piece of printed currency regardless of the manner in which the piece of currency is inserted into the tray 30. As indicated above, the magnetic detection head in the brackets 37 and 38 is mounted to scan a longitudinal track along the center of a piece of currency between the belts 26 and 27 so that the head will see the same pattern of indicia regardless of which face of the bill is placed upwardly in the tray 30. Also, the bill can be reversed end for end in the tray 30 without preventing the apparatus from recognizing it since if the head sees the pattern of indicia backwards with reference to the counterpart on the drum 42 when a bill is moving into the machine (toward the left as viewed in FIG. 1), reversal of the shaft 23 to reject the bill will permit the head to see the pattern of indicia properly as the bill moves out of the machine (to the right as viewed in FIG. 1) suitable switching (not shown) being provided to permit the head to look at and recognize the bill while it is passing in both directions.

While synchronous drive is provided between the shaft 23 and the counterpart drum 42 through the gears of FIG. 2 and the clutch surfaces 45 and 46, this driven connection is electronically synchronized at the beginning of each test and is electronically re-synchronized a plurality of predetermined times while a piece of currency is passing the magnetic flux detecting head. This re-synchronization permits the apparatus to recognize all bills of any given denomination even where different spacings are found between different local areas of printed indicia on the bills of a given denomination. This electronic synchronization is provided by the use of a plurality of mechanical stops for interrupting rotation of the rotatable drum 42 just prior to the beginning of each test and at a plurality of rotational positions of the drum during the passage of a piece of currency under the head. The mechanical stops are then released electronically responsive to the detection of magnetic flux by the head so that rotation of the counterpart drum 42 is initially synchronized and is later re-synchronized responsive to the actual arrival of areas of printed matter at the magnetic detection head.

As may be seen most clearly in FIGS. 4 and 6 and in a corresponding portion of the apparatus of FIG. 14, a plurality of stop members 61 are mounted on one end of the drum 42 by means of bolts 62, and the members 61 have stop ends 63 axially spaced of the drum from each other and cooperating with a corresponding plurality of adjustable stop screws 64 so that rotation of the drum 42 is interrupted when the stop end 63 of one of the stops 61 contacts its corresponding stop screw 64. The stop screws 64 are mounted on the movable arm 65 of a stop release relay 66 so that energization of the relay 66 pulls the stop screw 64 to the left as viewed in FIG. 6 to thereby release them from the stops 61. It should here be noted that the stop screws 64 are mounted on a spring arm 67 against the resiliency of which the stop screws 64 are moved when they contact the stops 61. This movement of the stop screw 64 in opposition to spring 67 causes the opening of a pair of normally closed switch contacts 68 and the closing of a pair of normally open contacts 69. The functions of these switch contacts 68 and 69 will become more apparent in connection with the description of FIG. 10.

In addition to the switches 68 and 69 which are actuated by the drum 42, a cam actuated stack of switches 70 (see FIGS. 1 and 10) is actuated by a roller 70a which moves along a track on the opposite edge of the drum 42 from the stops 61. The stack of switches 70 includes seven contacts 71–77 and a pair of insulators 78 and 79. The contacts 71–73 define a single pole double throw switch in which the contacts 71 and 72 are closed at the starting rotational position of the drum (when the roller 70a descends into a notch 80 in the drum 42) (see FIG. 10). At all other rotational positions of the drum 42, the switch contacts 71 and 72 are open, and the switch contacts 72 and 73 are closed. A plurality of small areas 81 of the periphery of the drum 42 are provided with slight rises therein which effect closing of the switch contacts 74 and 75, and a large cam 82 is provided on the drum positioned to contact the roller 70a just before the roller 70a moves into the notch 80. When the roller 70a moves over the large cam 82, the switch terminals 76 and 77 are connected. As will appear from the description of FIG. 10, the switches 68 through 77 are employed to control the automatic logic which forms a portion of the apparatus.

*Flux sensing head portion of magnetometer*

As mentioned heretofore an important feature of the invention is the provision of an improved magnetic flux sensing head which has sufficient sensitivity from the standpoint of measuring small quantities of flux and resolving closely spaced lines of printed matter that the apparatus of this invention is capable of recognizing pieces of currency and distinguishing between different denominations thereof by scanning the magnetic pattern of a magnetized bill. This sensitivity is obtained through the new design of a flux measuring head used in a flux gate magnetometer, that is, the type of magnetometer in which measurement of magnetic flux is accomplished by periodically varying the reluctance of a magnetic conductor with a driving magnetic field.

Referring more specifically to FIG. 7, the flux sensing head illustrated therein comprises a pair of blades 83 and 84, a magnetic shunt 85, and two pairs of magnetic conductors 86 and 87 connecting the shunt 85 to the blades 83 and 84 respectively. The elements 83–87 are preferably constructed of a very low magnetic reluctance material such as Mu-metal, and these elements define a magnetic conductor having opposite ends 88 and 89 which are beveled with the blades 83 and 84 slanting away from each other as they diverge from the edges 88 and 89. The flux sensing head shown in FIG. 7 is illustrated at several times its actual size, the edges 88 and 89 being very closely spaced together (on the order of 10–30 thousandths of an inch apart), and this magnetic conductor is enclosed within a magnetic shield 90 having a shaped aperture 91 therein with the edges 88 and 89 of the magnetic conductor positioned in the aperture 91. A backing plate 92 constructed of a relatively low reluctance material is mounted adjacent to the edges 88 and 89 of the magnetic conductor and the aperture 91 of the shield 90 with the spacing between the backing plate and the shield and conductor being very small. In the operation of this head, magnetic flux flowing generally perpendicular to the backing plate 92 is measured as it flows through the magnetic conductor, the flow of magnetic flux through the conductor being caused by differences in magnetic potential adjacent to the two edges 88 and 89. Thus, assuming a higher potential adjacent the edge 88, flux would flow from backing plate 92 to the edge 88 upwardly through the strips 86, across the shunt 85, down the strips 87, through the edge 89 and back to the backing plate 92. Thus, it will be noted that measurable flux passes through the conductor only when a gradient of magnetic potential exists between the edges 88 and 89, and with these edges so close a very high degree of resolution is obtained with the head. To some extent magnetic flux is also caused in the magnetic conductor for instance by the flow of flux from the edges of the aperture 91 in the shield 90 to the edges 88 and 89 of the magnetic conductor, but such induced magnetic flow is very small when compared to the flow caused by differences in magnetic potential immediately adjacent to the edges 88 and 89. It should be noted that the positioning of the edges 88 and 89 within the aperture 91 of the shield 90, together with the provision of the backing plate 92, provides an extremely sensitive flux measuring device since the magnetic conductor is affected by very little flux other than the flux immediately adjacent to its edges.

The geometrical area from which magnetic flux flows to the conductor can be further controlled, when desired by shaping the backing plate 92; the provision of a ridge on the backing plate 92 immediately under the aperture 91 and parallel to the aperture 91, and the provision of such ridges extending perpendicular to the aperture 91 may be desirable in some instances.

When magnetic flux flows along the above-mentioned path through the conductor, it is measured by electrical coils 93 and 94 which are wound on the strips 86 and 87 respectively. The coils 93 and 94 are connected together as indicated so that alternating current input at terminals 95 will alternately establish closed magnetic loops in the conductor first in the direction of the arrows thereon and then in the opposite direction. The establishment of these closed loops of magnetic flux especially when the input current is sufficiently high to saturate the strips 86 and 87, effectively provides switches which turn on and off the flow of measurable flux through the conductor from the backing plate 92 as described above. When the input alternating current at terminals 95 has a predetermined frequency, the path of measurable flux is turned on and off at an even multiple of the predetermined frequency, and as this measurable flux is turned on and off, it induces current in the coils 93 and 94. When detection leads 96 are connected to the coils as illustrated, this even harmonic induced current can be detected from these terminals. Thus, with this arrangement an input current at frequency F is applied to terminals 95 and an output signal is detected at terminals 96 at a frequency of 2F. The construction of the head as illustrated provides maximum sensitivity of the head first from the standpoint of producing large signals at terminals 96 compared to noise and secondly from the standpoint of the production of these large signals from very small magnetic sources in very small physical areas between the edges 88 and 89 of the conductor and the backing plate.

A similar magnetic head is shown in FIG. 8 where the flux gate coils 93 are provided in only one leg (83) of the magnetic conductor. A further alternative form of head is shown in FIG. 9 where the magnetic conductor is provided with only one leg and return path for magnetic flux flowing to the backing plate is provided through the shield 90 surrounding the magnetic conductor. In this form of the head, the path of measurable flux is indicated by the arrows 97, and the path of the closed loop flux which turns the measurable flux on and off is indicated by the arrows 98.

For some particular applications of the magnetometer heads of this invention particularly where they are used in currency recognizing apparatus, it may be desirable to employ devices sensitive to the Hall effect as the magnetic flux measuring element in the head. In such an application where the head of FIG. 8, for instance, is to be used, the conductor strips 86 and the coils 93 may be replaced by a wafer of a material sensitive to the Hall effect with the plane of the wafer perpendicular to the path of magnetic flux in the conductor 83. An A.C. drive current of predetermined frequency is then applied through the wafer along the plane of the wafer, and a voltage proportional to the magnetic flux in the conductor 83 is detected across the wafer in a direction perpendicular to the direction of the drive current and having the same A.-C. frequency as the drive current.

*Synthetic counterpart of known piece of currency*

As mentioned heretofore the apparatus of FIGS. 1–10 employs a physical counterpart which is a parameter of the detection signal which would be generated by the magnetometer when a piece of printed currency of known validity and denomination was delivered to the belts 26 and 27. In FIGS. 4 and 5, the drum 42 is illustrated as carrying such physical counterparts for three different denominations of printed currency. Thus, electrical switch wipers 107 are provided for contacting pairs of switch projections 108 and 109 with the pairs of projections carried respectively by electrical conductor strips 110 and 111 for the projections 108 and conductor strips 111 and 112 for the projections 109. These conductor strips and projections form a counterpart of a one dollar bill. Only those conductor strips and projections are illustrated on the drum 42 in FIG. 10 for the sake of simplicity of illustration, however, additional switch wipers are illustrated in FIG. 5 for the other denominations, a pair of wipers 113 and associated strips being provided for recognition of five-dollar bills, and a pair of wipers 114 and associated strips being provided for recognition of ten-dollar bills. As explained in detail hereinafter, each of the pairs of wipers 107, 113 and 114 cooperates with three of the electrical conductor strips on the drum 42, the wipers 113 cooperating with the strips 112, 115 and 116, and the wipers 114 cooperating with the strips 116, 117 and 118. Preferably, a selector switch is connected to these three pairs of wipers 107, 113 and 114 to connect a selected pair to the comparison and logic parts of the device, so that one set of comparison and logic parts may recognize a plurality of denominations. For a totally automatic machine however, or for a similar currency sorting machine, a plurality of sets of comparison and logic parts are preferably used.

As illustrated in FIG. 11, the shapes of the conductor strips on the drum are chosen from a knowledge of the predetermined detection signals which would be generated by the magnetometer when pieces of printed currency of known validity and denomination were moved past the magnetometer head by the belts 26 and 27. While the shapes of the conductor strips are selected, they are parameters of these predetermined detection signals because the predetermined detection signals are first recorded and then employed as explained hereafter as the basis for proper selection of the shapes of the conductor strips. An auxiliary group of switch wipers is connected to the conductor strips as illustrated in FIGS. 4 and 5 with the auxiliary switch wipers 119 connected to the conductor strips 110, 112, 116, and 118, and auxiliary wipers 120 being connected to the conductor strips 111, 115, and 117. The wipers 119 are connected to one of the output leads of the magnetometer, and the wipers 120 are connected to the other output lead of the magnetometer so that at any given instant, the output of the magnetometer is applied to the conductor strips on the drum with one polarity of the output being applied to the wipers 119 and the other polarity to the wipers 120. Referring for simplicity to FIG. 10, and assuming that the wiper 120 is either positive or negative with respect to the wipers 119 it will be seen that the polarity of the detection signal conducted to the pickup wipers 107 will be determined by the rotational position of the drum 42 since contact between wipers 107 and switch projections 108 will conduct one polarity of the detection signal, and contact between the wipers 107 and the switch projections 109 will conduct the detection signal to the wipers 107 with opposite polarity.

It should be here mentioned that recognition of a piece of printed matter is accomplished with the apparatus of FIG. 10 by integrating the detection signal from the magnetometer over the period that a piece of currency passes the detection head. Since this magnetometer is, however, sensitive to the rate of change of the density of the pattern of printed indicia on the currency, the unaltered integral of the detection signal during the period a bill is examined would give a zero integration sum. The function then of the counterpart switching elements on the drum 42 is to select known portions of the signal a bill is expected to give, reversing the polarities of these portions where desired, and integrating the detection signal after adjusting the polarity of its parts. In other words, when the wipers 119 are positive with respect to the wiper 120, and a valid one-dollar bill is being examined, the wipers 107 will contact switch projections 108 yet when the polarity of the detection signal reverses so that wiper 120 is positive with respect to wiper 119, the wipers 107 will contact the switch projections 109.

It will thus be seen that the conductor strips 110, 111, and 112 on the drum 42 together with the switch wipers 107 form a physical counterpart of the detection signal which a valid one-dollar bill is known to give, this physical counterpart operating to permit the production of a high integration sum by integrating the signal between the wipers 107 if the polarity of the detection signal generated by the magnetometer varies in the same manner as the predetermined detection signal from which the shape of the conductor strips has been derived.

To further illustrate the manner of selection of the shape of the conductor strips on the drum 42, reference is made to FIG. 11 in which the upper four curves represent as indicated portions of the wave form of the detection signal which may be generated by a particular magnetometer when four pieces of currency of known validity and of different denominations are examined by the magnetometer. It should be noted that these four wave forms may represent the signals from individual one, five, ten, and twenty dollar bills, but in fact that are at least three kinds of five dollar bills for instance in general circulation which produce three different signals, and when a five dollar bill is to be recognized, all three of these signals should be recognized while rejecting the signals which would be produced by all kinds of bills of other denominations. Each wave form indicates the amplitude and polarity of each detection signal plotted against the position on the bill at which the amplitude is generated. The characters in the lower portion of the drawing show corresponding switching patterns which could be derived from the wave shapes for recognizing each indicated denomination of currency. While it is understood that three shaped conductors are employed for regulating the polarity of the detection signal for each denomination, the simple graphs are shown in indicating the use of the three conductor strips to effect "regular" polarity where a projection projects upwardly from the median line and "reverse" polarity when the projection extends downwardly. With this in mind consider the locations of projections 121, 122, and 121a in the pattern for the recognition of a one-dollar bill. It will be noted that an integrator connected between projections 108 for regular polarity at area 121 will accumulate a positive integral whether the bill being examined is a one, a ten or a twenty, but that if the bill being examined is a five the integrator will accumulate a negative sum thus discriminating against a five. At a later time then the integrator is connected between projections 108 for regular polarity at area 122, the integrator will again accumulate a positive sum for a one-dollar bill but will accumulate substantially no sum for the five and large negative sums for the ten and twenty. When the integrator is connected for "reverse" polarity at area 121a, the integrator will accumulate substantially nothing from a ten or twenty dollar bill; it will accumulate a large positive sum from the negative signal of the one-dollar bill, and it will accumulate a large negative sum from the positive signal of the five-dollar bill. Proper selection of the positioning and the direction of these projections will result in the recognition of any one denomination and the refusal to recognize bills of any other denomination.

This proper selection of the positioning and direction of the projections is accomplished as follows: The detection signals from each kind of bill of each denomination are recorded as time line graphs for instance during the period when the bills pass the head of the magnetometer; portions of this period are then selected during which the one-dollar signals, for instance, differ substantially from at least one of the remainder of the signals; the selected portions are then divided into two groups where (1) in the period portions of the first group, the one-dollar signal is substantially more positive than the other signal and (2) in the period portions of the second group, the one-dollar signal is substantially more negative than the other signal the switching projections are then reversed for the two groups, the projections represented at 121 and 122 in FIG. 11 being in one group while the projections represented at 121a in FIG. 11 being in the other group.

Thus, regular polarity projections may be selected for recognizing the one-dollar bill where: (1) the one-dollar signal is strongly positive and any one of the remainder of the signals is strong negative, slightly negative, zero, or slightly positive, (2) the one-dollar signal is slightly positive and any one of the remainder of the signals is strongly negative, slightly negative or zero, (3) the one-dollar signal is zero and any other signal is strongly or slightly negative or (4) the one-dollar signal is slightly negative and any other signal is strongly negative. Similarly, reverse polarity projections may be selected where: (1) the one-dollar signal is strongly negative and any one of the remainder of the signals is strongly positive, slightly positive, zero, or slightly negative, etc. The positions and polarity of the projections in the period of the signals are preferably chosen where the signal to be recognized differs substantially from all other signals, but in many instances this is not possible and positions must be chosen where it is possible to discriminate against only a few or only one of the undesired signals.

*Preferred complete system*

Referring now in detail to FIG. 10, the elements and subcombinations described above are here illustrated in combination together with various electronic means for controlling the complete system. Here the magnetic detection head 100 shown in FIG. 7 together with its backing plate 101 are shown enclosed in a double magnetic shield 102 in the brackets 38 and 37, and a reversible drive motor 103 is shown driving the shaft 23 and the counterpart drum 42 through the friction clutch 47. The magnetic head is shown connected to a conventional head drive oscillator 104 which supplies the alternating input current to the leads 95 of the detection head. The magnetic head 100 is also connected to a conventional tuned amplifier and synchronous detector 105 by which the detection signal from terminals 96 of the head are amplified and converted to a detection signal delivered to leads 106 with the detection signal being a direct current signal the amplitude of which is proportional to the quantity of measurable flux flowing in the magnetic conductor of the head of FIG. 7 and the polarity of which at any instant is determined by the direction measurable flux is flowing in that magnetic conductor. For the sake of convenience, the complete magnetometer which produces this detection signal is referred to as comprising a flux sensing head portion thereof which is mounted adjacent to the path between the belts 26 and 27 and a power means portion thereof which includes the head drive oscillator, tuned amplifier and synchronous detector which may be located either adjacent to the head or at a substantial distance therefrom.

As indicated above, the switch wipers 107 in FIG. 10 are connected to an integrator 123 which is arranged here to be set initially at a high voltage permitting the detection signal to integrate it downwardly during the period a bill is examined. The integrator is initially set at a fairly high voltage and connected to the switch wipers 107, as explained hereafter, so that a signal which is to be recognized will integrate the integrator sum downwardly to a lower voltage while undesired signals will integrate the sum upwardly to a higher voltage. The integrator is preferably provided with latching means for latching the integrator sum at a high voltage at any time that the voltage increases more than a predetermined amount from the voltage initially set. Such latching means may be provided by a Zener diode connected to turn on a tube when the integrator voltage exceeds the switching voltage of the diode with the tube being connected to the integrator to raise the integration sum additionally, when the tube is turned on.

The voltage accumulated by the integrator, which represents the integral of the signal conducted to the integrator, is conducted to a voltage comparator 124 by lines 125. The comparator is arranged to compare the voltage across lines 125 to a preset low voltage and conduct current to leads 126 when the signal from wipers 107 has integrated the voltage in leads 125 down to the preset voltage of the comparator. This current in leads 126 from the comparator is conducted to recognition logic 130 through the coil of a normally open relay 131 to close the relay 131 responsive to current in leads 126. It should be noted that the switch terminals 68 on the stop actuated switch of FIGS. 5 and 6 are connected in parallel with the switch terminals of relay 131 so that either the relay 131 or the switch 68 when closed can maintain a normally open relay 133 in logic 130 energized through a pair of contacts 134 of relay 133. At all times that relay 133 is energized, it maintains a pair of its contacts 135 closed permitting a relay 136 to be energized therethrough when switch terminals 76 and 77 of the cam operated switch 70 close just prior to termination of a revolution of the drum 42. This relay 136 has a pair of switch terminals 137 thereof the closing of which is the act by which the logic circuit 130 recognizes a bill which has been tested by the apparatus. According, it should be noted that at any time when the drum 42 is moving and the switch contacts 68 are thus closed, the switch contacts 68 will maintain the relay 133 energized to thereby permit subsequent actuation of the relay 136 at the end of a cycle. When one of the stop members 61 contacts a stop screw 64 thereby opening the switch contact 68, the relay 133 will be de-energized unless the comparator 124 has energized the relay 131 indicating that the preceding area of the bill being examined had accumulated a sufficient integral to actuate the comparator.

If at any time the drum 42 is stopped and the switch 68 opened, when the integrator 123 has not yet accumulated a sufficient integral to actuate the comparator, the relay 133 will be de-energized because both the switch 68 and the relay 131 are open, and the relay 133 will remain de-energized until the drum 42 returns to its starting position and switch contacts 72 and 71 are closed; note that this is the only way relay 133 can be reenergized since its own contacts 134 are now open. As soon as relay 133 is de-energized, a relay 139 in the logic 130 will be energized through contact 140 of the relay 131, and relay 139 has a pair of normally open contacts 141 the closing of which is the act by which the logic circuit 130 rejects a test bill.

It should be noted that the provision of the latching means with the integrator adds substantial flexibility to the above-mentioned method of selecting the positions and directions of the switch projections on the drum 42. Thus any particular denomination bill may be rejected by positioning the projections so that the first part of its signal which is conducted to the integrator causes the integrator to latch at high voltage.

It should be recalled that a pair of switch contacts 74 and 75 on the cam actuated switch 70 are closed at desired portions of the period of rotation of the drum 42, and it should be noted that these switch contacts close a circuit to the tuned amplifier 105 whereby the gain of the amplifier is increased until the contacts are again opened. This permits selective emphasis of local portions of the detection signal produced by the magnetometer.

Indicated centrally of FIG. 10 is a multi-terminal relay 142 having an energizing coil 143 and a plurality of arms 144–148. In the relay 142 the relay arms move to their arms upward position when the coil 143 thereof is not energized. It will be noted that the coil 143 of relay 142 is connected to be energized through the normally open contacts 69 of the stop actuated switch shown in FIGS. 5 and 6 with the result that the relay coil 143 is energized and moves the arms 144–148 to their arms downward position every time that the drum 42 comes to rest. When the drum is moving and the arms are in their upward position, the arms 144 and 145 conduct the detection signal from the magnetometer to the switch wipers 119 and 120 on the counterpart drum 42; at the same time the switch arm 146 is inactive and the arms 147 and 148 conduct the polarity modified signal from switch wipers 107 on the drum 42 to the integrator 123.

When the drum comes to rest and the switch contacts 69 are closed, the arms 147 and 148 are connected to a voltage divider to reset the initial level of the integrator so that it can start to integrate downwardly when the drum begins to move again; at the same time switch arm 146 is connected to a source of positive voltage in connection with a timing capacitor 149 to prevent the resetting of the integrator from de-energizing the relay 133. Thus, high voltage is conducted to the comparator 124 with a time delay determined by the capacitor 149 to insure that the comparator energizes the relay 131 after the time delay. During the time delay the relay 131 may be energized or de-energized depending upon the prior condition of the comparator and integrator, and the period of the time delay is selected to be just shorter than the time necessary for the resetting of the integrator to influence the comparator. Also when the coil 143 is energized the arms 144 and 145 thereof move to their downward position to conduct the next portion of the detection signal from the magnetometer to a thyratron 150 which is in turn connected to the stop release relay 66. Generation of the next portion of the detection signal from the magnetometer will thereby actuate the stop release relay 66 and restart motion of the counterpart drum 42 in synchronization with motion of a piece of currency along its path under the magnetometer head.

It should also be noted in FIG. 10 that an additional actuating circuit is provided for the thyratron 150, this circuit being connected through switch contacts 72 and 73 and having a fairly long time constant, the purpose of the circuit being merely to actuate the thyratron and return the counterpart drum to its starting position in case of bill failure to pass, when the drum 42 stops for an unduly long time at some intermediate point in the cycle.

Finally it should be noted in FIG. 10 that a triode 151 has its plate and cathode connected to supply negative feedback to the direction terminals 96 of the magnetometer head. The grid of triode 151 is connected to the output of the power means portion of the magnetometer through a switch 152 to increase the amount of negative feedback to the head portion responsive to increases in the magnitude of the direct current detection signal, whereby when the switch 152 is closed the triode 151 automatically attenuates to a large degree the production of any detection signal by the magnetometer. The switch 152 connecting the grid of the triode 151 to the output of the magnetometer is a normally closed switch which is opened responsive to closing of the start 31 adjacent to the input tray of the device (see FIG. 1), and triode 151 is selected to have a very long leakage time for its grid potential so that the triode 151 will maintain a substantially constant level of negative feedback for a substantial period of time after operation of the apparatus is started responsive to closing of the switch 31 and the opening of switch 152. In order to increase the leakage time of the grid potential of triode 151, a capacitor 151a is connected to the grid between the grid and the switch 152. It should also be noted that means are provided for holding the switch 31 closed and the switch 152 open until the closing of switch contacts 71 and 72; this insures that the switch 31 will not stop operation of the drive motor before completion of a cycle and it assures that the switch 152 will not provide automatic suppression of the detection signal when a detection signal is desired. It should be noted further that a substantial advantage is provided through the use of this means for automatically attenuating the detection signal produced by the magnetometer particularly since the magnetometer employed in this invention and forming a part thereof is so highly sensitive. Small changes in the magnetic field around the device could produce an excessively biased detection head through which magnetic flux flowed continually thereby producing a detection signal which was not the desired parameter of the pattern of printed indicia on pieces of currency being examined by the device.

*Alternative systems offering even greater sensitivity*

The systems illustrated in FIGS. 12 and 13 differ from the system of FIG. 10 in that the systems of FIGS. 12 and 13 employ a synthetic counterpart signal generator (as illustrated in FIGS. 14 and 15) through which an alternating current signal may be passed to produce an output which is a parameter of the shape of a predetermined wave. Where the shape of the predetermined wave is identical to a graphical recording of the detection signal generated by the magnetometer plotted against time as a piece of currency of known validity and denomination passes the head portion of the magnetometer, the output of the synthetic counterpart signal generator may be identical to the original detection signal which was generated by the known piece of currency. This is substantially the arrangement which is shown in FIG. 12 other components of the apparatus of FIG. 12 being common to or similar to FIG. 10. In FIG. 12, the synthetic counterpart signal generator is indicated by numeral 153 the generator having a wave form 154 to be explained in greater detail hereinafter. An electrical conductor 155 is moved longitudinally of the synthetic counterpart 153 and in synchronization with movement of a piece of printed currency past the head portion of the magnetometer. A drive signal is conducted to the synthetic counterpart 153 via two leads 156 and 157 with the signals conducted to the two leads being 180° out of phase from each other and having a frequency equal to the frequency of the signal picked up at contacts 96 of the head portion of the magnetometer. This arrangement produces an output signal from the conductor 155 where the signal is substantially identical to the signal produced at terminals 96 of the head portion of the magnetometer when the known piece of printed currency from which the wave form 154 was derived was past under the head portion. This output signal is added to the signal delivered to terminals 96 of the head portion of the magnetometer with the two signals 180° out of phase, and the combined signals are then passed through the amplifier and synchronous detector. It will thus be seen that with this system, the signal received from the head portion of the magnetometer from a test bill is compared continuously to a reference established by the counterpart 153 of the piece of printed currency of known validity and denomination. It will also be seen that such continuous comparison between the test signal and the reference signal is capable of producing a much finer degree of sensitivity in the apparatus. When exact identity appears between the signal leaving the magnetometer head 100 and the counterpart signal leaving the conductor 155, the resultant output from the power means portion of the magnetometer due to these signals is nil. The output of the power means portion of the magnetometer is passed through a full-wave rectifier 158 and then to an integrator 159 where the cumulative detection signal generated by the magnetometer is stored throughout a cycle of operation of the apparatus. During the period that the detection signal is being accumulated on the integrator 159, a series of stops 61 on the synthetic counterpart signal generator is enaged by a stop 64 which is released by a thyratron 66 in the same manner as in the apparatus of FIG. 10 to resynchronize the apparatus a plurality of times per cycle. In addition, while the integrator 159 is accumulating the detection signal produced by the magnetometer, a microswitch 160 counts the number of pawl stops made by the synthetic counterpart signal generator and energizes an "and" gate 161 after a predetermined number of stops so that the "and" gate 161 will at that time recognize or refuse to recognize a piece of printed currency depending upon the integration sum accumulated on the integrator 159 at that time. The evaluation of the integration sum on the integrator is determined by a comparator 162 which permits the integrator 159 to energize the "and" gate 161 if the accumulated signal on the integrator lies between predetermined maximum and minimum values. It should be noted that even though perfect correlation between the signal delivered by the head 100 and the synthetic counterpart signal would produce no integration sum, this apparatus is sufficiently sensitive that some integration sum is almost always present and the requirement that at least some small integration sum be present acts as a check to be certain that all units of equipment prior to the integrator are in operating condition. While the system shown in FIG. 12 has been illustrated and described as being relatively simple, it is preferable in most cases to use it together with one or more of the refined control means shown in FIG. 10. It should also be noted that with the system shown in FIG. 12 it is desirable to employ a gate filter 163 connected between the magnetometer drive oscillator and the synchronous detector and a variable biased control 164 or a similar automatic control like that shown in FIG. 10 for suppressing the production of unwanted signals by the magnetometer when no pieces of printed matter are being examined thereby. The synthetic counterpart signal generator is constructed in the same manner as the switching drum of FIGS. 4 and 5 with the surface of the drum carrying wave form counterparts of the electrical detection signals from a plurality of denominations of currency.

In FIG. 13 a system similar to that shown in FIG. 12 is illustrated differing from the system shown in FIG. 12 in that the variable capacitor 153 employed in the system of FIG. 13 as the synthetic counterpart signal generator is used not to produce a signal identical to the signal delivered by the head but instead to multiply the signal delivered by the head times the wave form 154 on the variable capacitor drum. This is accomplished as pointed out in greater detail in the discussion of FIGS. 14 and 15 by conducting the alternating current output of the head via lead 164 to the inputs 156 and 157 of the variable capacitor. Whereas in the system of FIG. 12 a constant input was employed to produce an output signal which is a parameter of the wave form 154, the system of FIG. 13 uses the variable output of the head 100 as the input to the variable capacitor 154 whereby the output of the variable capacitor via conductor 155 is a parameter of the product of the wave form 154 and the wave form of the signal produced by the head 100. In the system shown in FIG. 13 this product output is amplified in a second stage 165 and is then passed again through a synchronous detector 166, the integrator 158 and a comparator 167. In this system the means for stopping and restarting the synthetic counterpart signal means is employed in a manner similar to that of FIGS. 10 and 12. It should be noted that the comparator 167 employed in the system of FIG. 13 need establish but one limit since recognition of a piece of printed currency will result when the integration sum accumulated on the integrator 158 is very much higher than the integration sums accumulated when the wave forms of the head output and the wave form 158 do not coincide. The system of FIG. 13 may be particularly useful in environments in which the magnetometer produces a large amount of noise. After multiplication of the two wave forms, the variable polarity of noise will result in substantial reduction in the ratio between noise signals and desirable multiplication signals appearing in the integrator sum.

Referring specifically to FIGS. 14 and 15, it will be noted that the variable capacitor drum 153 described in FIGS. 12 and 13 comprises a rotatable drum 153 mounted on the frame 20 of the apparatus in a manner similar to the mounting of the drum 42 in FIG. 1, the drum 153 also carrying the stop members 61 on one of its ends. The drum carries two metal plates 168 and 169 insulated from each other and from the upper surface of the drum by the insulating material which makes up the drum. A thin boundary of insulating material defines the wave form 154 on the surface of the drum, the wave form being an electrically insulated boundary between the two plates 168 and 169. The metal plates 168 and 169 have exposed protrusions 170 and 171 thereon respectively, the protrusions 170 and 171 being connected respectively to the electrical leads 156 and 157 in FIGS. 12 and 13. An insulator bar 172 is mounted on the frame 20 and carries a bifurcated blade 173 made of an electrically conductive material, with the blade 173 wiping over the surface of the drum 153 in as close contact therewith as possible. The layer of electrical insulation on the surface of the drum 153 prevents direct electrical connection between the blade 173 and the plates 168 and 169.

It should be noted that the blade 173 is the counterpart of the electrical conductor 155 in FIGS. 12 and 13, the conductor 155 being illustrated as a roller which moves over the surface of the drum. It has been found that the use of the bifurcated blade 173 provides a much more efficient device because of the tendency of particles of dust and the like on the surface of the drum 153 to move the conductor 155 away from the surface of the drum.

Assuming for the moment that the blade 173 is positioned over a portion of the drum 153 where equal areas of the blade 173 lie adjacent to the two electrical plates 168 and 169; the combination of the two plates 168 and 169 together with the blade 173 thereby define a pair of capacitors connected in parallel, the blade 173 forming a common plate of the two capacitors. When the electrical signals connected to the plates 168 and 169 are 180° out of phase as indicated in the description of FIGS. 12 and 13, electrical elements connected to the blade 173 will be unaffected by either capacitor so long as the areas of the two capacitors are equal. However, as the drum 153 rotates so that the wave form 154 of the boundary between the plates makes the capacitor of which plate 168 is a component larger than the capacitor of which plate 169 is a component, then electrical elements connected to the blade 173 will be influenced by the one capacitor more than the other; the electrical signal connected to the smaller capacitor will cancel out a portion of the out of phase electrical signal connected to the larger capacitor, but the larger capacitor will convey to the blade 173 an alternating current proportional in amplitude to the difference between the areas of the plates 168 and 169 immediately under the blade 173. In this manner, rotation of the drum 153 will cause the blade 173 to conduct an alternating current the amplitude of which is a parameter of the shape of the boundary line 154. This provides a very simple and efficient manner for producing a synthetic counterpart signal generator which will generate an electrical signal which is the parameter of any desired wave form that can be drawn.

The variable capacitor drum illustrated in FIGS. 14 and 15 is easily prepared by a photo-engraving process whereby the plates 168 and 169 are originally continuous but the boundary line 154 therebetween is etched away. This is particularly advantageous in the present invention where it is possible to connect a graphic recorder to the magnetometer portion of the apparatus and record the detection signal produced by the magnetometer as a function of time during which the signal is produced. A graphic record may be made when a valid piece of currency is moved past the head 100 and this record thus produced may be photographically enlarged or reduced to the desired size without altering its character and the proper photographic representation of the wave form can then be precisely etched into the surface of the drum. It should be noted that in some situations it is desirable to further alter such a recorded graphic representation of the detection signal before making the variable capacitor drum; thus it is desirable to have the wave form 154 on the variable capacitor drum shortened to some degree adjacent to the position where the blade 173 will stop on the drum when the stop members 61 interrupt rotation of the drum. This alteration of the wave form is desirable so that each stop member 61 will always arrive at stop 64 and interrupt rotation of the drum prior to the time when a portion of a bill being tested arrives at the head portion of the magnetometer to generate the desired electrical signal for resynchronizing movement of the drum. Thus it should be noted that it is desirable to cut away from the wave form from which the boundary 154 is made those portions of the boundary which correspond to the portion of the magnetometer's detection signal which will release the stop means on the drum and small zero signal portions preceding the releasing signal portions. Obviously this variable capacitor drum has a wide variety of applications for producing electrical signals having predetermined wave forms; the device may be used as described above for producing an amplitude modulated alternating current signal, or it may be combined with the synchronous detector in the usual manner to convert the alternating current signal into a direct current signal which is a similar parameter of the shape of the boundary line 154.

Referring to FIG. 16, there is shown therein a schematic drawing of another system of this invention with which the magnetic flux sensing heads of this invention may be used to recognize paper currency. In FIG. 16 a pair of parallel and laterally spaced conveyors 174 and 175 are positioned adjacent to a diagonal conveyor 176 which may be in the form of a roller with its axis inclined to the direction of movement of the conveyors 174 and 175 etc. The direction of movement of material across the conveyor 176 should be inclined at substantially an angle of 45° to the direction of movement of the conveyor 174. This proper inclination together with means for aligning the long edges of a piece of printed currency with the direction of movement of the conveyor 174 provides efficient means for positioning such a piece of currency on the conveyor 176 with the piece of currency moving at an angle of 45° to its long dimension. Mounted over the conveyor 176 are a pair of magnetic flux sensing heads 177 and 178 substantially similar to the flux sensing heads illustrated in FIGS. 7–9. However, the apertures 91 (see FIG. 7) in the heads 177 and 178 are substantially perpendicular to each other and each inclined at an angle of 45° to the direction of movement of currency on the conveyor 176.

It should be here noted that all of the denominations of U.S. currency which it would be desirable to recognize with apparatus of this type have a picture of a U.S. President on the face thereof, and the backgrounds in these pictures are made from grids of parallel lines with one group of lines in each background extending parallel to the long dimension of the currency and with another group of such parallel lines extending perpendicular to the long dimension of the currency. This type of pattern is illustrated in the symbolic enlarged portion 179 in FIG. 16. While these grids of intersecting lines in the backgrounds of the Presidents' pictures are similar to the naked eye when viewing U.S. bills of different denominations, it has been found that in fact the patterns are measurably different. For each denomination of U.S. currency this background cross-hatching appears to have a constant spacing between the lines which extend the length of the bill and a different constant spacing between the lines which extend the width of the bill and most important, the same combination of spacings between longitudinal and transverse lines in this cross-hatching is not found on bills of different denominations.

Accordingly, when a bill of a given denomination is moved along the apparatus illustrated symbolically in FIG. 16, the longitudinal lines will move across the conveyor 176 while they are maintained parallel to the elongated aperture 91 in the flux measuring head 177 and the transverse lines in the grid will be moved across the conveyor 176 while they are maintained parallel to the aperture 91 in the flux sensing head 178. The result of this orientation is the fact that the flux sensing head 177 senses a sequence of the longitudinal lines moving past it at one frequency while the flux sensing head 178 senses a sequence of the transverse lines moving past it at a second frequency. The flux sensing heads 177 and 178 do not see, or sense, the lines moving perpendicular to them because the head sees these lines as a uniform field; these perpendicular lines extend continuously across the apertures 91 in the heads and hence do not effect any noticeable changes in the flux sensed through the apertures.

In the system illustrated in FIG. 16 the two heads 177 and 178 are driven by a common head drive oscillator 180 and have their outputs connected to separate amplifiers 181 and 182 respectively. The amplifiers are connected to synchronous detectors which convert the amplified alternating current signals into alternating current signals having the frequency with which the ranks and files of lines move past the heads 177 and 178. These signals of different predetermined frequencies are then passed through band pass filters 185 and 186, rectifiers 187 and the coils 188 of a pair of relays. The switch terminals of the two relays are connected in series whereby an electrical circuit is completed between output terminals 190 and 191 when the magnetic flux sensing heads 177 and 178 sense the predetermined frequencies of the band pass filters 185 and 186 simultaneously.

Referring finally to FIG. 17, the system shown therein comprises suitable means (not shown) for supporting a bill 192 in a fixed position and power means for rotating an elongated gear shaft 193. A worm gear 194 in mesh with gear shaft 193 rotates a cylindrical drum 195. A pair of dynamic magnetic pickup heads 196 and 197 are imbedded in the drum 195 with the gaps 198 and 199 of the heads 196 and 197 respectively extending perpendicular to each other and inclined at angles of 45° to radial planes of the drum 195. The drum 195 is mounted over the picture portion of the bill 192 with the axis of rotation of the drum inclined at an angle of 45° to the long dimension of the bill 192 so that rotation of the drum effects vertical sweeping of the gap 199 across the picture portion and horizontal sweeping of the gap 198 across the picture portion. As a result of this sweeping, the head 196 generates a signal the frequency of which is a function of the rotational speed of shaft 193 and the spacing between vertical lines in the background (see 179 in FIG. 16) of the picture on the bill; this signal is not influenced by the horizontal lines because horizontal lines appear uniform to the gap 198 as explained above. Similarly, as a result of this sweeping, the head 197 produces a signal the frequency of which is a function of the rotational speed of shaft 193 and the spacing between the horizontal lines in the background of the picture.

A plurality of multilobed gears 200–204 are rigidly mounted on the shaft 193 rotatable therewith, and an inductive pickup 205–209 respectively is mounted adjacent to the periphery of each gear 200–204. The inductive pickups 205–209 produce electrical signals the frequencies of which are functions of the rotational speed of shaft 193 and the numbers of teeth on the gears 200–204 respectively. A gear 200–204 is provided and the number of teeth thereon chosen to correspond to a number of lines-per-inch (horizontal or vertical) found in the background of the picture on a valid piece of currency so that two of the pickups 205–209 will generate signals of approximately the same frequency as the heads 196 and 197 when a valid piece of currency is examined. It should here be noted that the rotational speed of the shaft 193 is not critical since increasing the speed of the shaft increases the frequencies of the detection signals and the counterpart signals which are generated by the pickups 205–209.

The detection signals from heads 196 and 197 are conducted by lines 210 and 211 respectively to amplifier mixers 212 and 213 respectively, suitable collector rings (not shown) being provided on the drum 195 for connecting the leads 210 and 211 to the heads 196 and 197. The counterpart signals from the inductive pickups 205–209 are also conducted to the amplifier mixers 212 and 213 by leads 214 and 215 respectively so that when a detection signal and a counterpart signal of similar frequency are conducted to the same amplifier mixer, the amplifier mixer will deliver an output having beats at a frequency equal to the difference between the frequencies of the detection and counterpart signals. These outputs of amplifier mixers 212 and 213 are conducted to low frequency band pass filters 216 and 217 respectively which pass current only when the difference between the frequencies of their associated detection and counterpart signals are small. The filters 216 and 217 may be connected to rectifiers and relays paired in series as shown in FIG. 16 to recognize a particular denomination bill when the proper filter 216 and the proper filter 217 conduct substantially simultaneously.

While a number of specific features of this invention and the inventive subcombinations thereof have been illustrated and described in detail herein, it is obvious that many modifications in the structure disclosed may be made without departing from the spirit and scope of the invention.

Accordingly, what is claimed is:

1. The method of recognizing a predetermined one of a plurality of predetermined electrical signals in which each of said signals in said plurality changes in amplitude and polarity during a given signal period which comprises selecting a number of portions of said period during which said predetermined one signal differs from at least one of the remainder of the signals in said plurality with each of said signals of said remainder differing from said predetermined one signal during at least one of said portions, dividing said selected portions of said period into first and second groups with said predetermined one signal during each of said portions of said first group being substantially more positive than at least one other signal during said portion and with said predetermined one signal during each of said portions of said second group being substantially more negative than at least one other signal during said portion, integrating an unknown one of the signals of said plurality during said selected portions of said period while reversing the polarity of said unknown signal during the portions of one of said groups, and examining the sum of said integration after said period of said unknown signal to determine if said unknown one of said signals is said predetermined one signal.

2. The method of claim 1 characterized further in that said division step is performed by placing in said first group the majority of said selected portions of said period during which the amplitude of said one signal is positive and placing in said second group the majority of said selected portions during which the amplitude of said one signal is negative.

3. The method of claim 1 characterized further by the inclusion of the step of selecting as one of said portions of said period an interval during which said one signal has a large amplitude of one polarity and one of the remainder of said signals has a large amplitude of opposite polarity.

4. The method of claim 1 characterized further by the inclusion of the steps of selecting as one of said portions of said period an interval during which the amplitude of said one signal is substantially zero and the absolute value of the amplitude of one of the other of said signals is large, and placing said interval in said first group when the polarity of said one other signal is negative and placing said interval in said second group when the polarity of said one other signal is positive.

5. The method of claim 1 characterized further by the inclusion of the steps of selecting as one of said portions of said period an interval during which said one signal has a large amplitude of one polarity, a first other signal has an amplitude of said one polarity, and a second other signal has an amplitude of opposite polarity, and selecting as a second one of said portions of said period an interval where said one signal differs substantially from said first other signal.

6. The method of claim 1 characterized further by the inclusion of the step of selecting as one of said portions of said period an interval during which said one signal and one of said other signals have similar polarities but different amplitudes.

7. The method of claim 1 characterized further by the inclusion of the steps of presetting the sum of said integration before integrating said unknown signal, predetermining the direction in which said integration sum will change if said unknown signal is said one signal, and while integrating said unknown signal preventing said integration sum from returning to said preset sum when said integration sum changes by a predetermined amount from said preset sum in a direction opposite to said predetermined direction.

8. The method of claim 2 characterized further in that said division step is performed by placing in said first group the majority of said portions during which each of the signals of said remainder is negative and placing in said second group the majority of said portions during which each of the signals of said remainder is positive.

References Cited

UNITED STATES PATENTS

| | | | |
|---|---|---|---|
| 3,104,369 | 9/1963 | Rabinow et al. | 340—146.3 |
| 3,114,831 | 12/1963 | Birbaum et al. | 235—181 |
| 3,202,761 | 8/1965 | Bibbero | 340—149 XR |
| 3,245,534 | 4/1966 | Smith et al | 340—146.3 XR |

JOHN W. CALDWELL, *Primary Examiner.*

THOMAS B. HABECKER, *Examiner.*

D. J. YUSKO, *Assistant Examiner.*